United States Patent
Andrén et al.

(10) Patent No.: US 9,745,786 B2
(45) Date of Patent: Aug. 29, 2017

(54) ROLLER ASSEMBLIES FOR HANGING PANELS

(71) Applicant: Krown Lab, Inc., Portland, OR (US)

(72) Inventors: Stefan B. Andrén, Portland, OR (US); Steven W. Savas, Milwaukie, OR (US); Michael Erwin, Portland, OR (US)

(73) Assignee: Krown Lab, Inc., Portland, OR (US)

( * ) Notice: Subject to any disclaimer, the term of this patent is extended or adjusted under 35 U.S.C. 154(b) by 0 days.

(21) Appl. No.: 15/157,666

(22) Filed: May 18, 2016

(65) Prior Publication Data

US 2016/0340951 A1 Nov. 24, 2016

Related U.S. Application Data

(60) Provisional application No. 62/163,903, filed on May 19, 2015.

(51) Int. Cl.
*E05D 15/06* (2006.01)
*F16C 33/58* (2006.01)

(52) U.S. Cl.
CPC .......... *E05D 15/063* (2013.01); *F16C 33/585* (2013.01); *E05Y 2201/602* (2013.01); *E05Y 2201/688* (2013.01); *E05Y 2900/10* (2013.01); *E05Y 2900/142* (2013.01); *F16C 2350/00* (2013.01); *Y10T 16/364* (2015.01)

(58) Field of Classification Search
CPC ..... E05D 15/063; E05D 15/16; E05D 15/165; E05D 15/0634; F16C 33/585; F16C 2350/00; E05Y 2201/602; E05Y 2201/688; E05Y 2900/102; Y10T 16/364; Y10T 16/35; Y10T 16/353; Y10T 16/361; Y10T 16/3834

USPC .......... 16/91, 87 R, 87.2, 90, 105; 248/323; 49/409
See application file for complete search history.

(56) References Cited

U.S. PATENT DOCUMENTS

| | | |
|---|---|---|
| 113,697 A | 4/1871 | Rumsey |
| 143,557 A | 10/1873 | Bignall |
| 223,985 A | 2/1880 | Bottomley |

(Continued)

OTHER PUBLICATIONS

Krown Lab Iconic sliding door hardware: Oden, www.krownlab.com/oden.html, published at least as early as Jun. 19, 2009.

(Continued)

*Primary Examiner* — William Miller
(74) *Attorney, Agent, or Firm* — Dascenzo Intellectual Property Law, P.C.

(57) ABSTRACT

Roller assemblies for hanging panels are disclosed herein. Roller assemblies according to the present disclosure are configured to support a hanging panel and include an elongate rail configured to be mounted on a surface. The roller assembly includes a trolley assembly, which includes a bearing assembly configured to translate the trolley assembly along the elongate rail and a bracket coupled to the bearing assembly and configured to be coupled to the hanging panel. The elongate rail includes a rail adjustment system configured to facilitate adjusting a position and/or an orientation of the elongate rail with respect to the surface. The rail adjustment system is concealed in a rail-assembled configuration, and includes at least two spaced-apart rail adjustment mechanisms.

30 Claims, 24 Drawing Sheets

(56) References Cited

U.S. PATENT DOCUMENTS

| | | | |
|---|---|---|---|
| 237,910 A | 2/1881 | Ryno | |
| 244,418 A | 7/1881 | Arnold | |
| 278,658 A | 5/1883 | Elliott | |
| 279,898 A | 6/1883 | Wilber | |
| 281,537 A | 7/1883 | Mack | |
| 350,347 A | 10/1886 | Clements | |
| 408,502 A | 8/1889 | Morley | |
| 851,064 A | 4/1907 | Burkholder | |
| 862,561 A | 8/1907 | Hunt | |
| 1,571,334 A | 2/1926 | Howard | |
| 1,609,390 A | 12/1926 | Viberg | |
| 1,697,485 A | 1/1929 | Ware | |
| 1,981,906 A | 11/1934 | Dodds, Jr. | |
| 2,611,920 A | 9/1952 | Borden | |
| 2,617,141 A * | 11/1952 | Sterling | E05D 15/063 16/105 |
| 2,697,010 A | 12/1954 | Hirschmugl | |
| 2,843,872 A | 7/1958 | Harmon | |
| 3,142,859 A | 8/1964 | Suska | |
| 3,182,350 A | 5/1965 | Witten | |
| 3,311,942 A * | 4/1967 | Edeus | E05D 15/0634 16/105 |
| 3,553,765 A | 1/1971 | Frost | |
| 3,555,612 A | 1/1971 | Procton | |
| 4,288,887 A | 9/1981 | Johnson et al. | |
| D266,396 S | 10/1982 | Neville | |
| D266,614 S | 10/1982 | Neville | |
| 4,391,019 A | 7/1983 | Downes | |
| 4,478,006 A | 10/1984 | Johnson, Jr. | |
| 4,798,149 A | 1/1989 | Hoffmann | |
| 5,070,575 A | 12/1991 | Redman et al. | |
| 5,111,549 A | 5/1992 | Johnson | |
| D365,511 S | 12/1995 | Wright | |
| D385,480 S | 10/1997 | Mayo | |
| D434,640 S | 12/2000 | Kwok | |
| D466,796 S | 12/2002 | Lacey | |
| 6,698,138 B1 | 3/2004 | Lin | |
| D494,048 S | 8/2004 | Goodman et al. | |
| 6,865,848 B2 | 3/2005 | Krimmel | |
| 6,880,469 B2 | 4/2005 | Frost | |
| D559,080 S | 1/2008 | Boote | |
| D602,768 S | 10/2009 | Goodman et al. | |
| 7,637,059 B2 | 12/2009 | Chang et al. | |
| 7,762,517 B1 | 7/2010 | Leseman | |
| 7,797,853 B2 | 9/2010 | Compton | |
| D651,502 S | 1/2012 | Andren | |
| 8,443,574 B2 | 5/2013 | Yu et al. | |
| 8,474,097 B2 | 7/2013 | Andren et al. | |
| D729,049 S | 5/2015 | Andren et al. | |
| D729,050 S | 5/2015 | Andren et al. | |
| 2001/0011583 A1 | 8/2001 | Spork | |
| 2004/0223675 A1 | 11/2004 | Adrianus | |
| 2005/0072890 A1 | 4/2005 | Elmer | |
| 2008/0134554 A1 | 6/2008 | Pitcher et al. | |
| 2009/0127412 A1 | 5/2009 | Kleege | |
| 2010/0313382 A1 | 12/2010 | Andren et al. | |
| 2011/0072613 A1 | 3/2011 | Hays | |
| 2011/0147131 A1 | 6/2011 | Wang et al. | |
| 2011/0315846 A1 | 12/2011 | Andren et al. | |

OTHER PUBLICATIONS

Krown Lab Iconic sliding door hardware: Rob Roy, www.krownlab.com/robroy.html, published at least as early as Jun. 19, 2009.
Axel—Krownlab, www.krownlab.com/products/hardware-systems/axel/#axel#17, published at least as early as Jul. 13, 2014.
U.S. Appl. No. 29/523,075, filed Apr. 6, 2015, Andren et al.
U.S. Appl. No. 29/523,080, filed Apr. 6, 2015, Andren et al.
U.S. Appl. No. 29/527,491, filed May 19, 2015, Andren et al.

* cited by examiner

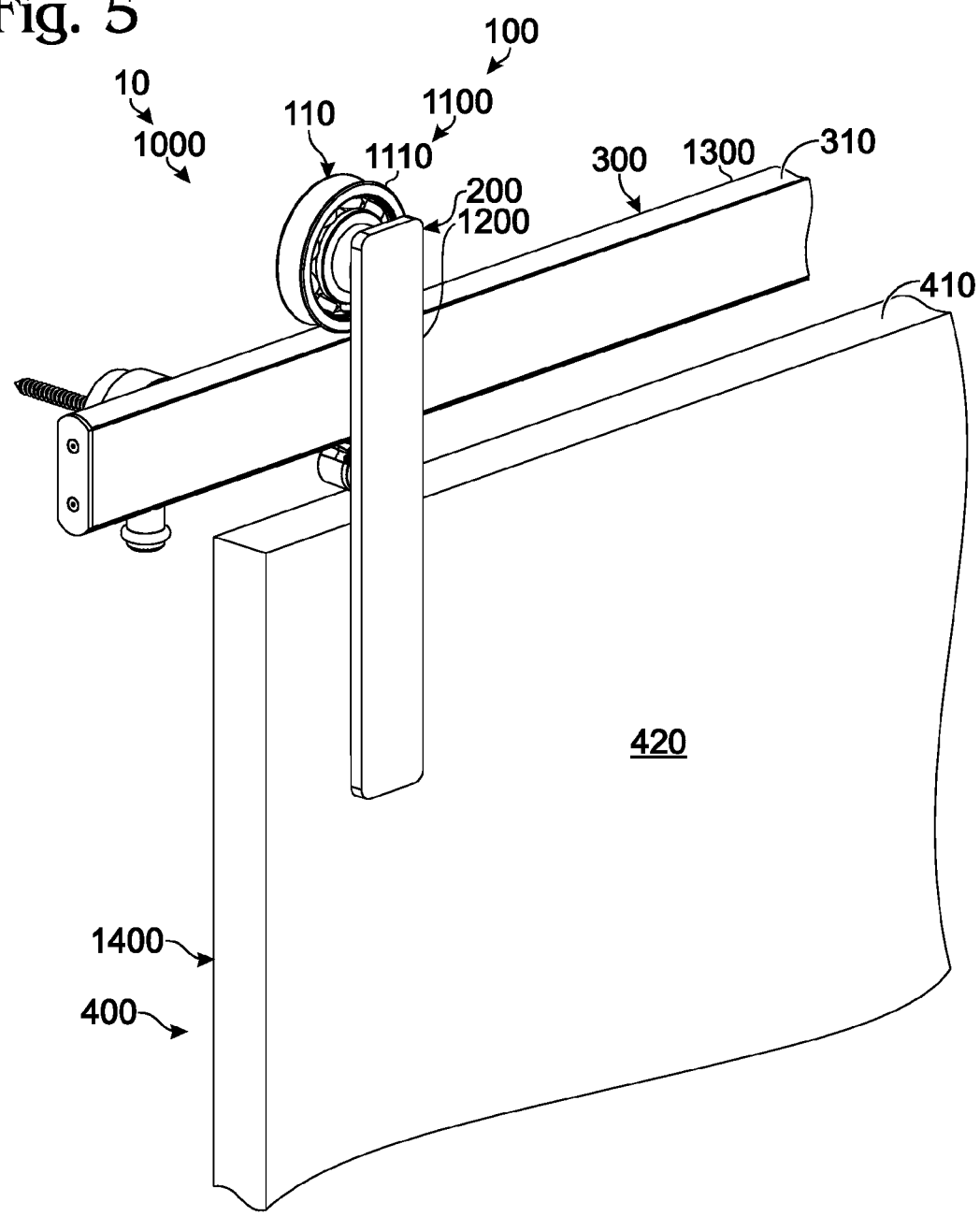

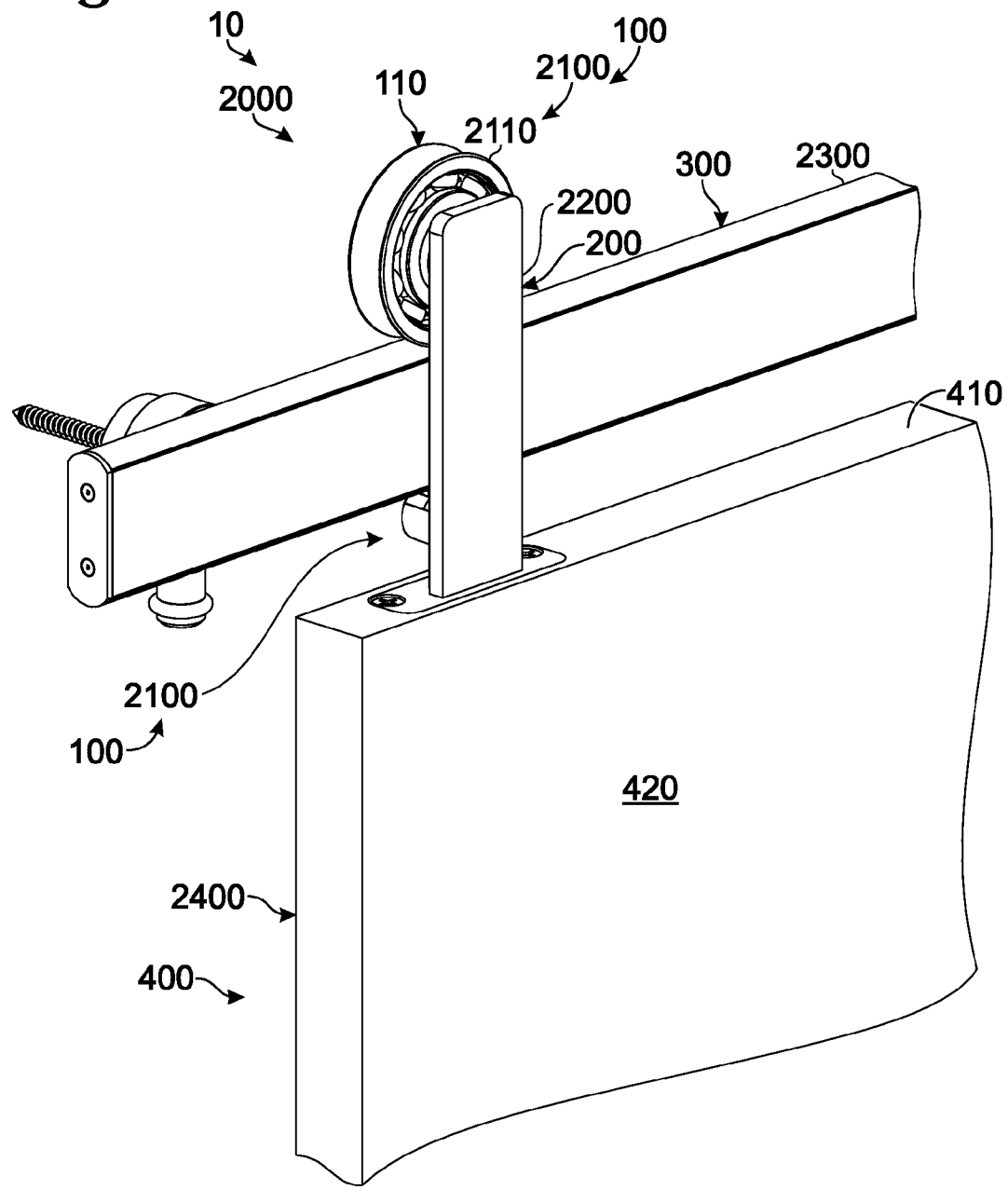

ROLLER ASSEMBLIES FOR HANGING PANELS

RELATED APPLICATION

This patent application claims priority to U.S. Provisional Patent Application No. 62/163,903, entitled "ROLLER ASSEMBLY FOR SLIDING PANEL," which was filed on May 19, 2015, and the complete disclosure of which is incorporated herein by reference.

FIELD

The present disclosure relates to roller assemblies for hanging panels.

BACKGROUND

Panels or other objects, such as doors, windows, ladders, movie screens, artwork, window coverings, curtains, and the like, have long been well-known architectural and design options. Hardware frequently is used to slide these panels from side-to-side using wheels that roll along a horizontal track. Some designs include wheel and track hardware that is visible to users. However, conventional designs for visible hardware for these panels tend to be cumbersome and have low tolerances between mating parts. This can result in instability of the hardware as it rolls along the track and, therefore, cause instability of the panels attached to the hardware.

Additionally, aligning these hanging panels can be challenging and minor adjustments often are needed. In some arrangements, these hanging panels need to be aligned with respect to the wall, another structure within the room, or another hanging object. These hanging panels often are secured to a wall or another structure at or near the ceiling of a room, which leaves little space to adjust and align the hanging panels. Much of the conventional hardware is bulky and difficult to adjust within such a small space.

SUMMARY

The present disclosure is directed to roller assemblies for hanging panels. Roller assemblies according to the present disclosure are configured to support a hanging panel and include an elongate rail configured to be mounted on a surface. The elongate rail has a generally horizontal top rail portion and a bottom rail portion that is at least substantially parallel to the top rail portion. Roller assemblies also include a trolley assembly configured to move along the elongate rail and to support the hanging panel. The trolley assembly includes a bearing assembly configured to translate the trolley assembly along the top rail portion and a bracket coupled to the bearing assembly and configured to be coupled to the hanging panel for sliding the hanging panel along the elongate rail. The elongate rail includes a rail adjustment system configured to facilitate adjusting a position and/or an orientation of the elongate rail with respect to the surface. The rail adjustment system is concealed in a rail-assembled configuration, and includes at least two spaced-apart rail adjustment mechanisms.

BRIEF DESCRIPTION OF THE DRAWINGS

FIG. 5 is a fragmentary perspective view of an example roller assembly according to the present disclosure, shown together with a hanging panel.

FIG. 6 is a fragmentary perspective view of an example roller assembly according to the present disclosure, shown together with a hanging panel.

DESCRIPTION

Figure 1:
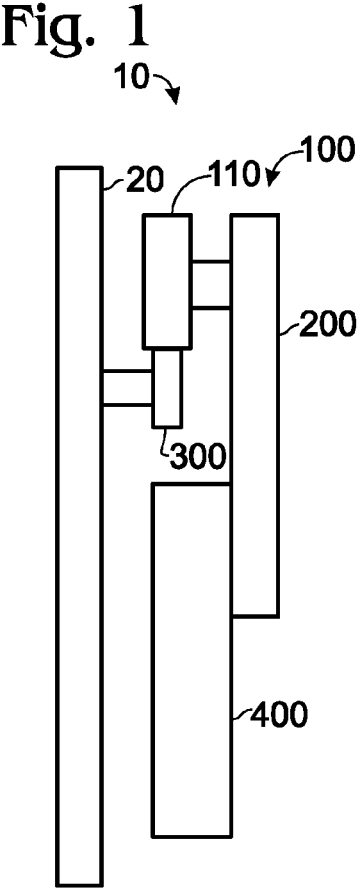
FIG. 1 is a schematic side view representing roller assemblies according to the present disclosure, shown together with a hanging panel.

Roller assemblies and component parts thereof according to the present disclosure are schematically illustrated in FIGS. 1-4, with roller assemblies generally indicated at 10. As schematically illustrated in FIG. 1, a roller assembly 10 according to the present disclosure includes an elongate rail 300 and at least one trolley 100 that is configured to move along elongate rail 300. The trolley 100 includes a bearing assembly 110 and a bracket 200 coupled to bearing assembly 110. As used herein, trolley 100 also may be referred to as a trolley assembly 100. Elongate rail 300 is configured to be mounted on a surface 20 and to support a panel 400. Specifically, bearing assembly 110 is configured to slide along a top surface of elongate rail 300. As used herein, elongate rail 300 also may be referred to as a rail 300. Bracket 200 is configured to be coupled to panel 400 in any appropriate manner. For example, bracket 200 may be configured to be operatively coupled to an upper edge of panel 400, and/or may be configured to be operatively coupled to a vertical face of panel 400. As used herein, panel 400 also may be referred to as a hanging panel 400 or a sliding panel 400, and may be or include (but is not limited to) one or more of a window, a ladder, a screen, an artwork, a shelving, and/or a window covering. Surface 20 may be any appropriate surface, such as a generally vertical wall and/or a generally horizontal ceiling, to which elongate rail 300 may be mounted and along which a panel 400 is desired to be positioned and slid.

In the Figures, the same reference numerals are intended to designate like and corresponding, but not necessarily identical, elements through the various Figures. Accordingly, when like-numbered elements are shown in two or more Figures, they may not be discussed in each such Figure, and it is within the scope of the present disclosure that the preceding discussion, including variants referred to therein, shall apply unless otherwise indicated. Similarly, while like-numbered elements, including illustrative values, materials, constructions, variants thereof, and the like, are described in two or more portions of the present disclosure and/or in connection with two or more Figures, it is within the scope of the present disclosure that these illustrative values, material, constructions, variants thereof, and the like may be applied even if not repeated in the discussion at each such occurrence.

As used herein, positional terms such as "top," "bottom," "front," "rear" and the like may be used to describe spatial relationships between components of roller assembly 10 in an illustrative, non-limiting manner. For example, bearing assembly 110 may be described as rolling along a top side of rail 300. Similarly, bracket 200 may be described as having a rear face that faces panel 400 when the panel is mounted on the bracket and a front face opposite the rear face. Such terms are provided as context only and do not limit component parts of roller assemblies 10 to always be in a specific orientation relative to ground.

Figure 3:
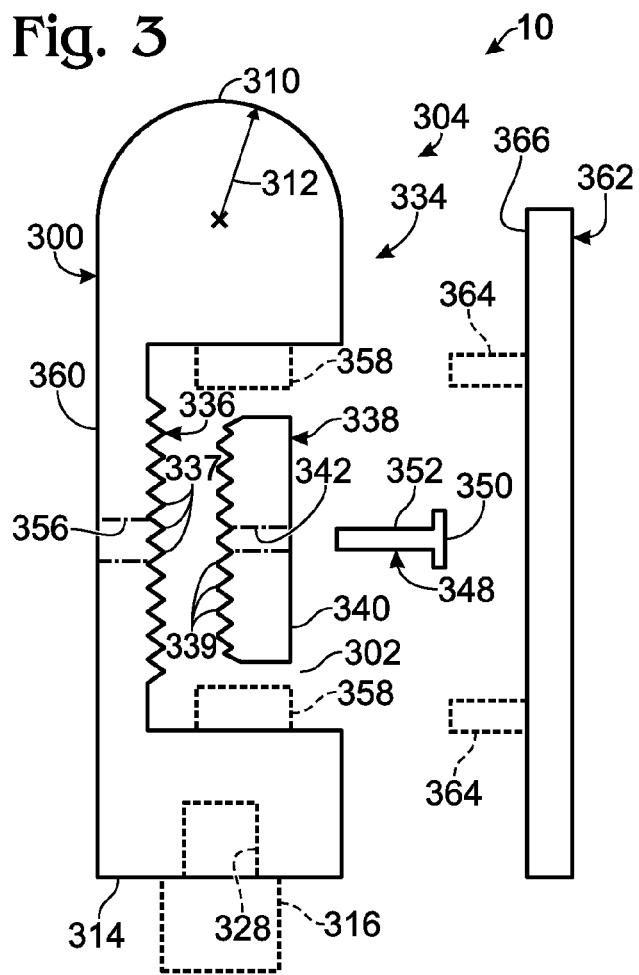
FIG. 3 is a schematic side view representing elongate rails of roller assemblies according to the present disclosure.
Figure 4:
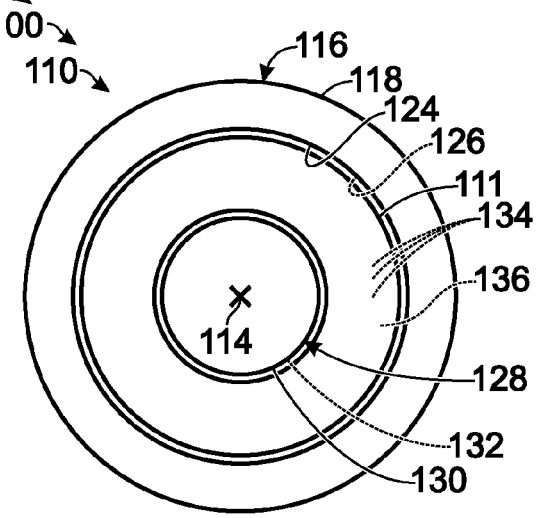
FIG. 4 is a schematic rear view representing bearing assemblies of roller assemblies according to the present disclosure.
Figure 2:
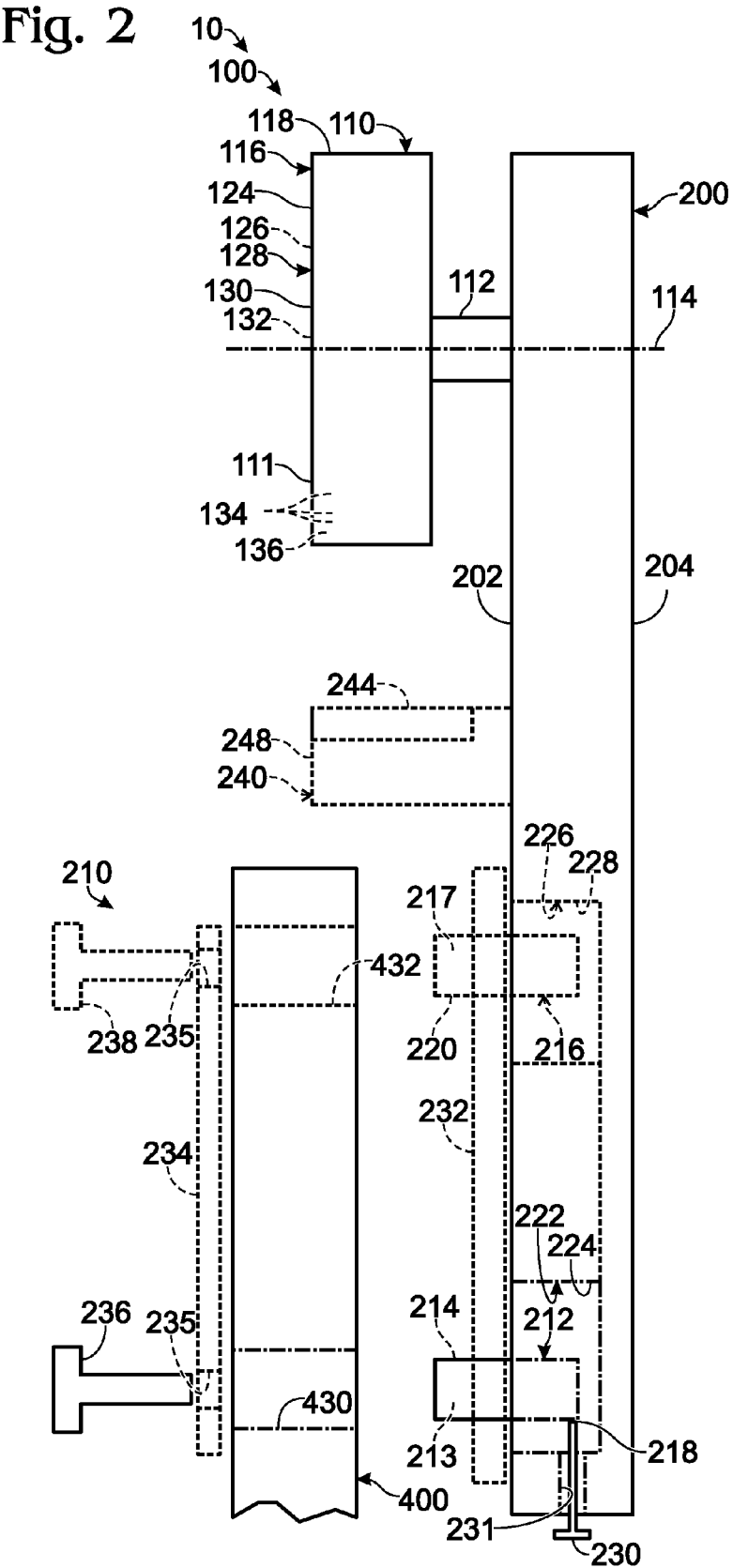
FIG. 2 is a fragmentary exploded schematic side view representing portions of roller assemblies according to the present disclosure, shown together with a hanging panel.

With reference to FIGS. 2 and 4, in some examples of roller assemblies 10, bearing assembly 110 includes an outer race 116 with an outer race outer contact surface 118 configured to contact a top rail portion 310 (illustrated in FIG. 3) of elongate rail 300 and an inner race 128 concentric with outer race 116. Bracket 200 is operatively connected to inner race 128 via a hub 112 configured to offset bearing assembly 110 from bracket 200 in a direction substantially parallel to a bearing assembly axis 114.

Outer race 116 may be configured to rotate with respect to inner race 128, and may be configured to move along top rail portion 310 without slipping with respect to the top rail portion. Stated differently, outer race 116 may be configured to rotate in such a way that the outer race remains in static contact with rail 300 (i.e., remain in contact with rail 300 without slipping against rail 300) while trolley 100 and/or panel 400 translate horizontally with respect to rail 300. Bearing assembly 110 additionally includes a bearing mechanism 111 located generally between outer race 116 and inner race 128 and configured to contact outer race 116 and inner race 128 to reduce a rolling resistance therebetween. Outer race 116 is configured to rotate about bearing assembly axis 114.

Outer race 116 includes an outer race inner contact surface 124 configured to contact at least a portion of bearing mechanism 111, and outer race inner contact surface 124 may include an outer race channel 126 configured to correspond to a shape of a portion of bearing mechanism 111. Similarly, inner race 128 includes an inner race outer surface 130 configured to contact at least a portion of bearing mechanism 111, and inner race outer surface 130 may include an inner race channel 132 configured to correspond to a shape of a portion of bearing mechanism 111. For example, and as schematically illustrated in FIG. 2, bearing mechanism 111 may include, or be, a plurality of rolling elements 134 located between and generally in contact with each of outer race 116 and inner race 128. Bearing assembly 110 additionally may include a cage 136 configured to retain the plurality of rolling elements 134 between outer race 116 and inner race 128. The plurality of rolling elements 134 may be configured to revolve about bearing assembly axis 114 while outer race 116 rotates about bearing assembly axis 114.

With reference to FIG. 3, elongate rail 300 includes top rail portion 310 that is generally horizontal when installed and a bottom rail portion 314 that is parallel, or at least substantially parallel, to top rail portion 310. As illustrated in FIG. 3, top rail portion 310 may have a convex cross-section characterized by a rail radius of curvature 312.

In some examples of roller assemblies 10, elongate rail 300 includes an integral face plate 360 that is integrally formed with top rail portion 310 and bottom rail portion 314 and a detachable face plate 362. Integral face plate 360 and detachable face plate 362 are coupled together in a rail-assembled configuration, such that integral face plate 360 and detachable face plate 362 define a rail cavity 302 therebetween in the rail-assembled configuration. Detachable face plate 362 is configured to be separated from a remainder of elongate rail 300 to expose rail cavity 302 in a rail-disassembled configuration, as schematically represented in FIG. 3. Integral face plate 360 may be proximal to surface 20 relative to detachable face plate 362 when elongate rail 300 is mounted on surface 20; however, this is not required, and it is within the scope of the present disclosure that integral face plate 360 may be distal surface 20 relative to detachable face plate 362 when elongate rail 300 is mounted on surface 20. Also within the scope of the present disclosure is an integral face plate 360 that includes only one of top rail portion 310 and bottom rail portion 314, and a detachable face plate 362 that includes the other of top rail portion 310 and bottom rail portion 314.

Detachable face plate 362 may include a face plate rear 366 that faces generally toward rail cavity 302 in the rail-assembled configuration, and may include at least one face plate attachment tab 364 positioned on face plate rear 366. Elongate rail 300 may include at least one corresponding face plate clip 358 configured to engage face plate attachment tab 364 to operatively secure detachable face plate 362 to integral face plate 360 in the rail-assembled configuration, such as to conceal rail cavity 302 from view.

Elongate rail 300 may have a side profile with any appropriate shape. For example, elongate rail 300 may have a side profile with a rectangular shape, a rectangular shape with rounded ends, a circular shape, an elliptical shape, an arch shape, a U-shape, a rounded top edge, a rounded bottom edge, a substantially flat top edge, and/or a substantially flat bottom edge. Additionally or alternatively, top rail portion 310 may include a top rail groove extending longitudinally along elongate rail 300.

Elongate rail 300 may be formed of any appropriate material. For example, at least a portion of the elongate rail may be formed of a plastic, a metal, aluminum, steel, copper, brass, gold, and/or silver. Additionally or alternatively, top rail portion 310 may be formed of any appropriate material, such as a plastic, a metal, aluminum, steel, copper, brass, gold, and/or silver, and may be formed of the same material as a remainder of integral face plate 360 and/or elongate rail 300 or a different material than the remainder of integral face plate 360 and/or elongate rail 300. Suitable plastics may include thermoplastics, such as polyoxymethylene, or acetal, a formulation of which is sold under the trademark DELRIN.

With continued reference to FIG. 3, elongate rail 300 includes a rail adjustment system 304 configured to facilitate adjusting a position and/or an orientation of elongate rail 300 with respect to a surface 20. In some examples of rail assemblies 10, rail adjustment system 304 is concealed within rail cavity 302 in the rail-assembled configuration and includes at least two spaced-apart rail adjustment mechanisms 334. For example, rail adjustment system 304 may include two rail adjustment mechanisms 334, three rail adjustment mechanisms 334, four rail adjustment mechanisms 334, and/or more than four rail adjustment mechanisms 334. Each rail adjustment mechanism 334 includes an adjustment face 336 defined on a portion of elongate rail 300 that faces rail cavity 302. For example, adjustment face 336 may be coupled to integral face plate 360 or may be integrally formed with integral face plate 360. Adjustment face 336 includes a series of adjustment face ridges 337 that are parallel, or at least substantially parallel, to top rail portion 310. Adjustment face ridges 337 may project from integral face plate 360 toward rail cavity 302.

Rail adjustment mechanism 334 further includes an adjuster plate 338 with one or more adjuster plate ridges 339 configured to engage adjustment face ridges 337 of adjustment face 336. Adjuster plate 338 additionally includes an adjuster plate face 340 opposite adjuster plate ridges 339 and an adjuster plate mounting hole 342 that extends through adjuster plate 338. Adjuster plate mounting hole 342 is generally aligned with a corresponding rail mounting hole 356 defined in integral face plate 360 when elongate rail 300 is mounted on surface 20.

Adjustment face ridges 337 and adjuster plate ridges 339 may have any appropriate complementary shapes. For example, each of the adjustment face ridges 337 may have a triangular profile and/or a sawtooth profile, and each of the adjuster plate ridges 339 additionally may have a triangular profile and/or a sawtooth profile, such that adjustment face ridges 337 and adjuster plate ridges 339 are configured to matingly engage.

Adjuster plate 338 may have any appropriate size and shape. For example, adjuster plate 338 may be generally rectangular and additionally may be generally square. Furthermore, adjuster plate 338 may have an adjuster plate width and an adjuster plate height such that a diameter of rail mounting hole 356 is smaller than the adjuster plate width and/or the adjuster plate height.

Rail adjustment mechanism 334 additionally may include a rail fastener 348 with a fastener head 350 and a fastener body 352. Fastener body 352 may be at least partially threaded. Fastener head 350 may have a width that is greater than a diameter of adjuster plate mounting hole 342, for example to inhibit adjuster plate 338 from sliding off of an end of rail fastener 348 that is not secured to surface 20. Rail fastener 348 may be configured to couple elongate rail 300 to surface 20 by extending through adjuster plate mounting hole 342 and through rail mounting hole 356 such that fastener head 350 engages adjuster plate face 340 to retain adjuster plate 338 against a portion of adjustment face 336 when elongate rail 300 is mounted to surface 20. In this configuration, adjuster plate ridges 339 may operatively engage with adjustment face ridges 337 to restrict movement of adjuster plate 338 relative to adjustment face 336. That is, engagement of adjuster plate ridges 339 with adjustment face ridges 337 may obstruct a vertical translation of elongate rail 300 with respect to surface 20 when rail fastener 348 is operatively coupled to surface 20 and tightened.

Additionally, fastener body 352 may have a width that is smaller than the width of fastener head 350 and that is smaller than the diameter of rail mounting hole 356, and rail mounting hole 356 may have a diameter that is greater than a diameter of adjuster plate mounting hole 342. For example, the diameter of the rail mounting hole may be at least 1.25 times, at least 1.5 times, at least 1.75 times, at least 2 times, at least 2.25 times, at least 2.5 times, less than 3 times, less than 2.75 times, less than 2.3 times, less than 2.1 times, less than 1.8 times, less than 1.6 times, and/or less than 1.3 times the width of the fastener body. In this configuration, a vertical position of elongate rail 300 with respect to surface 20 may be varied while a vertical position of rail fastener 348 and adjuster plate 338 relative to surface 20 is held fixed. Such a configuration may permit an adjustment of a vertical position of elongate rail 300 with respect to surface 20 while rail fastener 348 is inserted through adjuster plate mounting hole 342 and rail mounting hole 356 and into surface 20 without fully removing rail fastener 348 from surface 20.

As mentioned, rail adjustment system 304 includes at least two rail adjustment mechanisms 334, which may be used at spaced-apart locations along elongate rail 300. Accordingly, at each location of a rail adjustment mechanism 334, the vertical location of elongate rail 300 relative to surface 20 may be adjusted. As a result, not only can the overall vertical location of elongate rail 300 relative to surface 20 be adjusted, but also the angular orientation of elongate rail 300 may be adjusted.

With continued reference to FIG. 3, and as discussed in further detail herein, elongate rail 300 additionally may include a bumper stop 316 positioned on and/or coupled to bottom rail portion 314. Bumper stop 316 may be configured to limit a range of motion of trolley 100 and/or of panel 400 by providing a physical barrier to the motion of trolley 100 and/or of panel 400. In this way, a location of bumper stop 316 along bottom rail portion 314 may define a trolley stop point corresponding to a limit of the range of motion of trolley 100 and panel 400 along elongate rail 300.

In some examples of rail assemblies 10, a location of bumper stop 316 may be continuously adjustable along substantially an entire length of elongate rail 300. Additionally or alternatively, the location of bumper stop 316 may be configured to be continuously adjustable without obstruction by and/or interference with rail adjustment mechanism 334, with another object within or coupled to elongate rail 300, and/or with mounting hardware for mounting elongate rail 300 to surface 20. For example, bottom rail portion 314 of elongate rail 300 may include a bumper slot 328 extending longitudinally along elongate rail 300, and bumper stop 316 may be configured to engage with bumper slot 328. Bumper slot 328 may extend along substantially an entire length of bottom rail portion 314.

Returning to FIG. 2, bracket 200 of trolley 100 includes an interior bracket face 202 that generally faces panel 400 when the panel is installed on the bracket and an exterior bracket face 204 opposite interior bracket face 202. In some examples of rail assemblies 10, bracket 200 additionally includes a vertical panel adjustment mechanism 210 configured to adjust a position of panel 400 with respect to bracket 200 in a generally vertical direction. As used herein, vertical panel adjustment mechanism 210 also may be referred to as a panel adjustment mechanism 210 and/or as a vertical adjustment mechanism 210.

Figure 11:
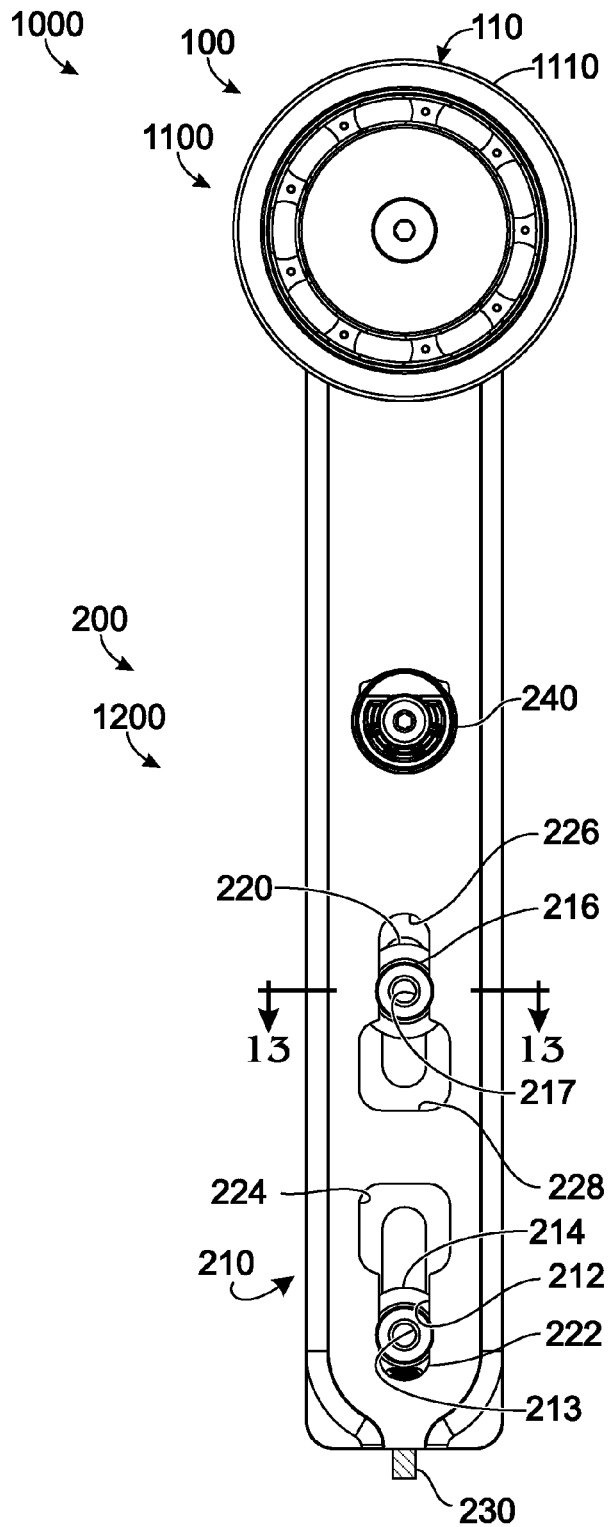
FIG. 11 is a rear view of a portion of the trolley assembly of the roller assembly of FIG. 5.
Figure 12:
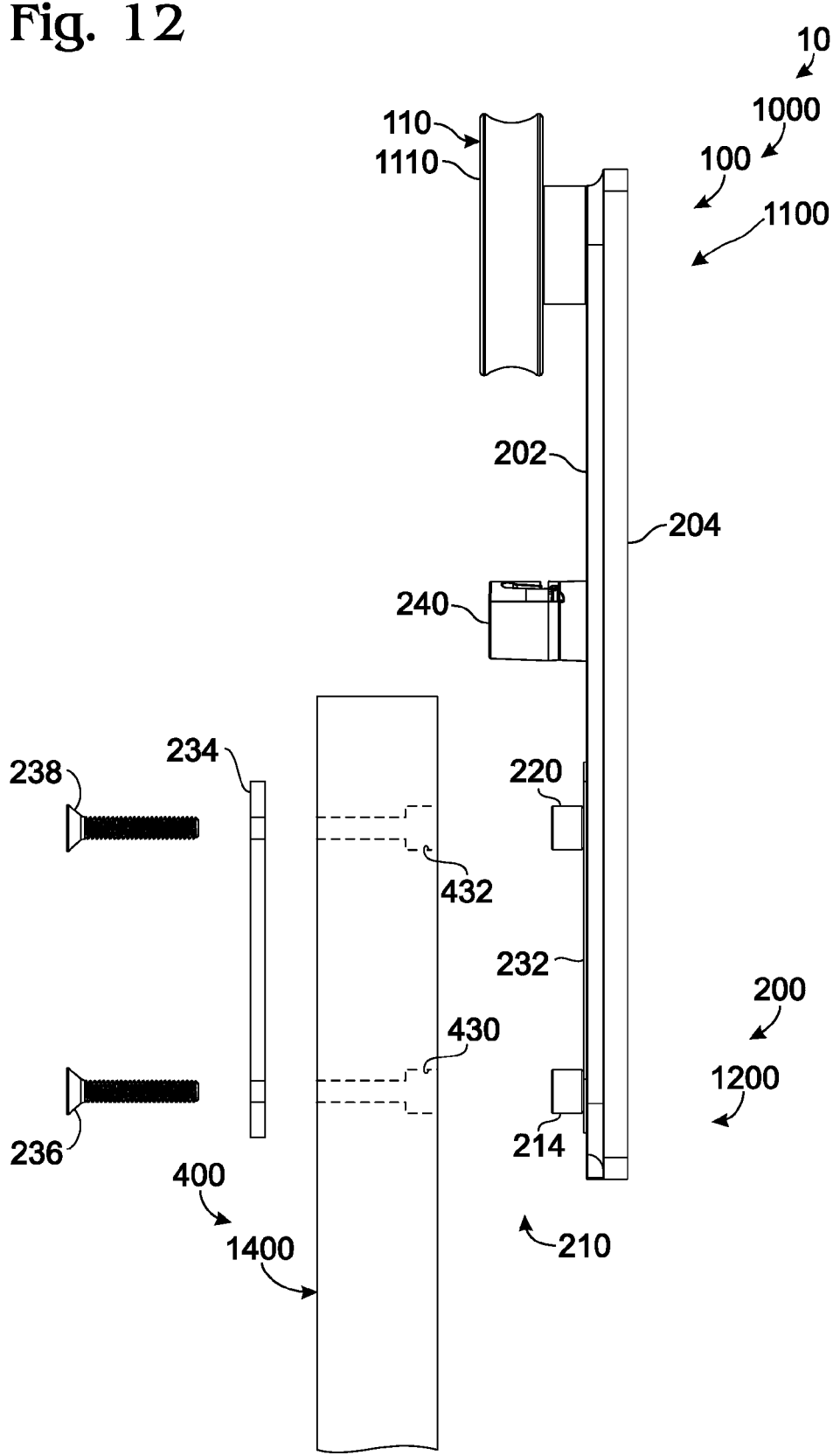
FIG. 12 is a fragmentary exploded side view of the trolley assembly of the roller assembly of FIG. 5, together with a hanging panel.

Vertical adjustment mechanism 210 includes an adjustment channel 222 recessed into bracket 200 from interior bracket face 202 and extending in a generally vertical direction, and further includes a dovetail pin 212 positioned partially in adjustment channel 222 and extending out of adjustment channel 222. Adjustment channel 222 includes an angled groove 223 with a tapered cross-sectional profile that tapers toward interior bracket face 202, and is configured to retain dovetail pin 212 at least partially within bracket 200, as seen with reference to the example of FIG. 13 discussed herein. Dovetail pin 212 is configured to slidingly engage with adjustment channel 222, and further is configured to be inserted into a corresponding panel mounting hole 430 on panel 400. Adjustment channel 222 additionally includes an installation opening 224 at a top end and/or a bottom end of the adjustment channel, which is configured to permit dovetail pin 212 to be inserted into adjustment channel 222. For example, with reference to the example of FIG. 11 discussed herein, installation opening 224 may be a widened opening that is sized to receive dovetail pin 212 into adjustment channel 222.

Vertical adjustment mechanism 210 additionally includes an adjuster screw 230 extending into bracket 200 from a bottom end of the bracket. Adjuster screw 230 engages dovetail pin 212 and is configured to adjust a vertical position of dovetail pin 212 along adjustment channel 222. Dovetail pin 212 may include an adjuster screw contact surface 218 that is engaged with adjuster screw 230, such that when adjuster screw 230 is tightened, dovetail pin 212 rises against gravity, and such that when adjuster screw 230 is loosened, dovetail pin 212 lowers with gravity.

It is additionally within the scope of the present disclosure that vertical adjustment mechanism 210 may include more than one adjustment channel and more than one dovetail pin. For example, and as optionally and schematically illustrated in FIG. 2, adjustment channel 222 may be a lower adjustment channel 222 with a lower installation opening 224, dovetail pin 212 may be a lower dovetail pin 212, and panel mounting hole 430 may be a lower panel mounting hole 430, and vertical adjustment mechanism 210 additionally may include an upper adjustment channel 226 with an upper installation opening 228 positioned generally vertically above lower adjustment channel 222, and an upper dovetail pin 216 positioned in upper adjustment channel 226. Panel 400 therefore may have an upper panel mounting hole 432 that is positioned generally vertically above lower panel mounting hole 430. As optionally and schematically illustrated in dashed lines in FIG. 2, lower adjustment channel 222 and upper adjustment channel 226 may be disconnected and/or may be discrete channels in bracket 200, or alternatively may be spaced-apart portions of a single elongate channel in bracket 200.

When vertical adjustment mechanism 210 includes lower dovetail pin 212 and upper dovetail pin 216, adjuster screw 230 may engage lower dovetail pin 212, such as to locate lower dovetail pin 212 within lower adjustment channel 222. Adjuster screw 230 may be configured to push lower dovetail pin 212, and thus to push panel 400, in a direction that is substantially opposite a force of gravity when adjuster screw 230 is caused to rise within bracket 200, such as being selectively tightened by a user. Conversely, when adjuster screw 230 is caused to lower from bracket 200, such as being selectively loosened by a user, the weight of panel 400 causes lower dove tail pin 212 to follow adjuster screw and lower within lower adjustment channel 222.

Moreover, in examples that include lower dovetail pin 212 and upper dovetail pin 216, the dovetail pins may be operatively coupled to one another, such as via panel 400 and/or via another component operatively coupled to each of lower dovetail pin 212 and upper dovetail pin 216. For example, lower dovetail pin 212 may include a threaded bore 213 configured to receive a lower panel mounting fastener 236, and upper dovetail pin 216 may include a threaded bore 217 configured to receive an upper panel mounting fastener 238. In such a configuration, and as illustrated in FIG. 2, lower panel mounting fastener 236 may be inserted through lower panel mounting hole 430 and into threaded bore 213 of lower dovetail pin 212, and upper panel mounting fastener 238 may be inserted through upper panel mounting hole 432 and into threaded bore 217 of upper dovetail pin 216 to operatively secure panel 400 to bracket 200. In such a configuration, when lower panel mounting fastener 236 is tightened into lower dovetail pin 212, a frictional engagement between lower dovetail pin 212 and the angled groove 223 of lower adjustment channel 222 may limit a range of motion of lower dovetail pin 212 with respect to lower adjustment channel 222. Similarly, when upper panel mounting fastener 238 is tightened into upper dovetail pin 216, a frictional engagement between upper dovetail pin 216 and an angled groove of upper adjustment channel 226 may limit a range of motion of upper dovetail pin 216 with respect to upper adjustment channel 226.

With continued reference to FIG. 2, vertical adjustment mechanism 210 additionally may include a lower pin sleeve 214 coupled to lower dovetail pin 212 and an upper pin sleeve 220 coupled to upper dovetail pin 216. Lower pin sleeve 214 and upper pin sleeve 220 may be configured to provide a physical and/or mechanical barrier between lower dovetail pin 212 and panel 400 and between upper dovetail pin 216 and panel 400 when lower dovetail pin 212 is inserted into lower panel mounting hole 430 and when upper dovetail pin 216 is inserted into upper panel mounting hole 432. Lower pin sleeve 214 and upper pin sleeve 220 may be configured to damp and/or attenuate vibrations propagating between lower dovetail pin 212 and panel 400 and between upper dovetail pin 216 and panel 400, such as to prevent damage to the panel. For example, lower dovetail pin 212 and/or upper dovetail pin 216 may be constructed of metal and panel 400 may be constructed of glass or another brittle material that may be readily damaged by vibrations. In such an embodiment, lower pin sleeve 214 and upper pin sleeve 220 may provide a cushion between lower dovetail pin 212 and panel 400 and between upper dovetail pin 216 and panel 400. Alternatively, vertical adjustment mechanism 210 may not include lower pin sleeve 214 or upper pin sleeve 220, and lower dovetail pin 212 and upper dovetail pin 214 may directly engage panel 400.

Lower pin sleeve 214 may circumferentially surround at least a portion of lower dovetail pin 212, and upper pin sleeve 220 may circumferentially surround at least a portion of upper dovetail pin 216. Lower pin sleeve 214 and upper pin sleeve 220 may be generally cylindrical, or may have any other appropriate shape. Lower pin sleeve 214 and upper pin sleeve 220 may be constructed of any appropriate material. For example, lower pin sleeve 214 and upper pin sleeve 220 may include glass, wood, plastic, thermoplastic, polyoxymethylene, acetal, rubber, synthetic rubber, a material that is softer than the panel, and/or a metal.

As illustrated in FIG. 2, vertical adjustment mechanism 210 additionally may include a cover plate 232 positioned at least partially over lower adjustment channel 222 and/or upper adjustment channel 226 to inhibit lower dovetail pin 212 from being removed from lower adjustment channel 222 and to inhibit upper dovetail pin 216 from being removed from upper adjustment channel 226. For example, cover plate 232 may at least partially cover lower installation opening 224 and/or upper installation opening 228. Cover plate 232 may be configured to facilitate a vertical translation of panel 400 with respect to bracket 200 when cover plate 232 is in contact with each of panel 400 and bracket 200 and when lower panel mounting fastener 236 and upper panel mounting fastener 238 are at least partially loosened.

Cover plate 232 may have any appropriate material construction to facilitate the vertical translation of panel 400 with respect to bracket 200. For example, a surface of cover plate 232 that faces panel 400 may include a plastic, a high-density polyethylene (HDPE), a fine surface finish, a fine surface roughness, and/or a low-friction surface.

Cover plate 232 may be operatively held in place relative to bracket 200 by lower dovetail pin 212 and upper dovetail pin 216, and/or may be fastened to bracket 200. For example, cover plate 232 may be glued, cemented, and/or adhered to interior bracket face 202.

With continued reference to FIG. 2, vertical adjustment mechanism 210 additionally may include a mounting plate 234 configured to be positioned on an opposite side of panel 400 relative to bracket 200. Mounting plate 234 may include one or more mounting plate apertures 235 configured to receive a corresponding panel mounting fastener, such that lower panel mounting fastener 236 and upper panel mounting fastener 238 are configured to retain mounting plate 234 against panel 400.

Mounting plate 234 may be configured to distribute a clamping force from lower panel mounting fastener 236 and/or upper panel mounting fastener 238 to panel 400. Stated differently, when lower panel mounting fastener 236 and upper panel mounting fastener 238 are tightly secured to lower dovetail pin 212 and upper dovetail pin 216, respectively, mounting plate 234 may ensure that pressure forces exerted by each of lower panel mounting fastener 236 and upper panel mounting fastener 238 are distributed across an area of panel 400 that is covered by mounting plate 234 and hence are less likely to cause damage to panel 400 relative to a configuration that lacks mounting plate 234.

Additionally or alternatively, mounting plate 234 may be configured to transmit a motion of lower dovetail pin 212 to upper dovetail pin 216 responsive to an adjustment of a position of lower dovetail pin 212 with adjuster screw 230. Stated differently, when adjuster screw 230 applies an upward vertical force on lower dovetail pin 212 with lower panel mounting fastener 236 and upper panel mounting fastener 238 at least partially loosened, the lower dovetail pin may apply a corresponding upward vertical force to mounting plate 234, which in turn may apply a corresponding upward vertical force to upper dovetail pin 216, such that lower dovetail pin 212 and upper dovetail pin 216 translate vertically in unison, or substantially in unison. Additionally or alternatively, lower dovetail pin 212 may be directly connected to upper dovetail pin 216.

With still further reference to FIG. 2, trolley 100 additionally may include a safety stop 240 coupled to bracket 200 and configured to inhibit removal of trolley 100 from elongate rail 300 when trolley 100 is installed on elongate rail 300. For example, safety stop 240 may be configured to limit a distance by which bearing assembly 110 may be lifted above elongate rail 300 when trolley assembly 110 is installed on elongate rail 300.

Safety stop 240 may be positioned generally between bearing assembly 110 and panel 400 when panel 400 is mounted on bracket 200. Safety stop 240 may extend from bracket 200 in the same direction as bearing assembly 110 extends from bracket 200, and/or may extend from interior bracket face 202 of bracket 200. Additionally or alternatively, safety stop 240 may extend from bracket 200 on the same side of bracket 200 as panel 400 when panel 400 is mounted on bracket 200. As illustrated in FIG. 2, safety stop 240 may include a bracket-mounted portion 248 rigidly secured to bracket 200 and a separable portion 244 configured to be selectively detached from bracket-mounted portion 248. Safety stop 240 may be configured such that trolley 100 is inhibited from removal from elongate rail 300 when separable portion 244 is coupled to bracket-mounted portion 248 and such that trolley 100 may be removed from elongate rail 300 when separable portion 244 is detached from bracket-mounted portion 248.

Turning now to FIGS. 5-6, illustrative, non-exclusive examples of roller assemblies 10 are presented. FIG. 5 illustrates a first illustrative example 1000 of a roller assembly 10 according to the present disclosure in which a bracket 1200, which is an example of bracket 200, is mounted to a front panel face 420 of a panel 1400, which is an example of panel 400. Panel 1400 additionally includes an upper panel edge 410. First illustrative example 1000 additionally includes a trolley 1100, which is an example of trolley 100; a bearing assembly 1110, which is an example of bearing assembly 110; and an elongate rail 1300, which is an example of elongate rail 300.

FIG. 6 illustrates a second illustrative example 2000 of a roller assembly 10 according to the present disclosure in which a bracket 2200, which is an example of bracket 200, is mounted to upper panel edge 410 of a panel 2400, which is an example of panel 400. Second illustrative example 2000 additionally includes a trolley 2100, which is an example of trolley 100; a bearing assembly 2110, which is an example of bearing assembly 110; and an elongate rail 2300, which is an example of elongate rail 300.

FIGS. 7-39 illustrate features of first illustrative example 1000. However, the features presented and discussed in the context of FIGS. 7-39 are not exclusive to first illustrative example 1000, and it is within the scope of the present disclosure that any appropriate feature may be included in second illustrative example 2000 and/or in any other embodiment of roller assemblies 10 according to the present disclosure.

As illustrated in FIGS. 7-10, bearing assembly 1110 includes outer race 116, inner race 128, a plurality of rolling elements 134, and cage 136 for rolling elements 134.

Figure 8:
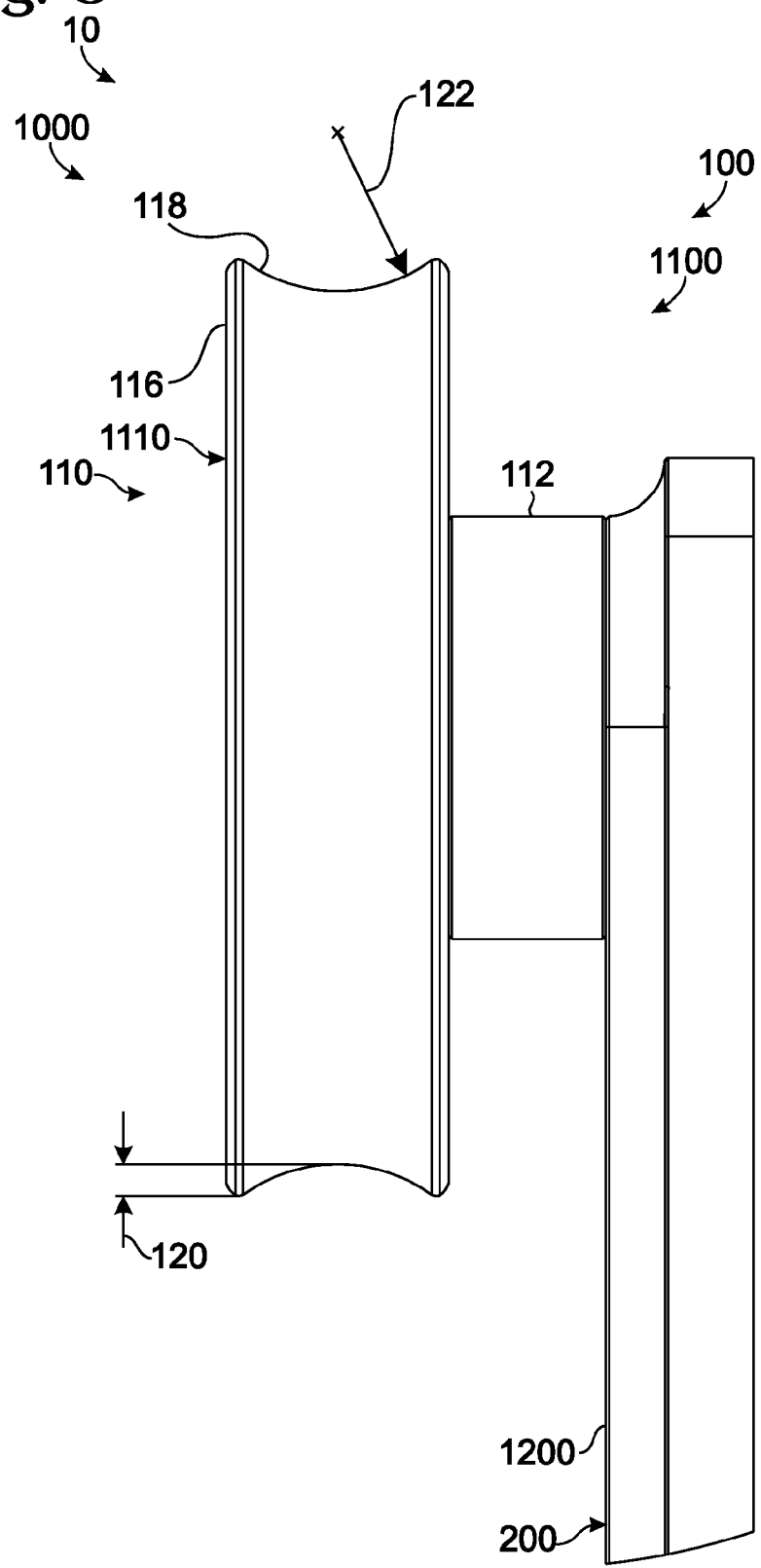
FIG. 8 is a fragmentary side view of a portion of the trolley assembly of the roller assembly of FIG. 5.

As illustrated in FIG. 8, outer race 116 of bearing assembly 1110 has a concave outer race outer contact surface 118 with an outer contact surface radius of curvature 122 and an outer contact surface depth 120. Outer contact surface depth 120 may be measured from a portion of outer race outer contact surface 118 that is proximal, or closest, to bearing assembly axis 114 to a portion of outer race outer contact surface 118 that is distal, or furthest from, bearing assembly axis 114.

Outer race outer contact surface 118 of bearing assembly 1110 has a cross-sectional shape that generally corresponds to a cross-sectional shape of top rail portion 310 of elongate rail 1300. For example, outer contact surface radius of curvature 122 may be slightly greater than rail radius of curvature 312 of top rail portion 310. For example, outer contact surface radius of curvature 122 may be at least 1% greater, at least 5% greater, at least 10% greater, at least 20% greater, at least 30% greater, at least 40% greater, at least 50% greater, at least 60% greater, at least 70% greater, at least 80% greater, at least 90% greater, at most 100% greater, at most 85% greater, at most 75% greater, at most 65% greater, at most 55% greater, at most 45% greater, at most 35% greater, at most 25% greater, at most 15% greater, at most 7% greater, and/or at most 3% greater than rail radius of curvature 312. In this way, trolley 1100 travels along elongate rail 1300, with top rail portion 310 of elongate rail 1300 fitting within outer race 116 and with outer race outer contact surface 118 contacting top rail portion 310 of elongate rail 1300.

Outer contact surface radius of curvature 122 may be generally constant. For example, outer race outer contact surface 118 may have a cross-sectional shape that is generally semi-circular. Alternatively, outer contact surface radius of curvature 122 may not be constant. For example, outer race outer contact surface 118 may have a cross-sectional shape that is arch- or U-shaped, parabolic, hyperbolic, rectangular, and/or trapezoidal. Additionally or alternatively, outer race outer contact surface 118 may have a cross-sectional shape that is substantially V-shaped.

Outer race 116 may be made from plastic or a metal, including steel and/or different colored metals, such as copper, gold, silver, etc. Additionally or alternatively, outer race 116 may include an outer race body and an outer race surface portion, which may be formed of different materials. The outer race surface portion may be formed by creating a thin plating and/or an outer surface coating over the outer race body. The outer race body and the outer race surface portion may be formed of any appropriate materials. For example, the outer race body may be formed at least substantially of metal, and/or the outer surface coating may include a plastic and/or a thermoplastic. Suitable plastics may include thermoplastics, such as polyoxymethylene, or acetal, a version of which is sold under the trademark DELRIN. The outer race body and the outer race surface portion may be distinct components that are mechanically connected or bonded together. Additionally or alternatively, the outer race surface portion may include, or be, a replaceable wear surface.

Figure 10:
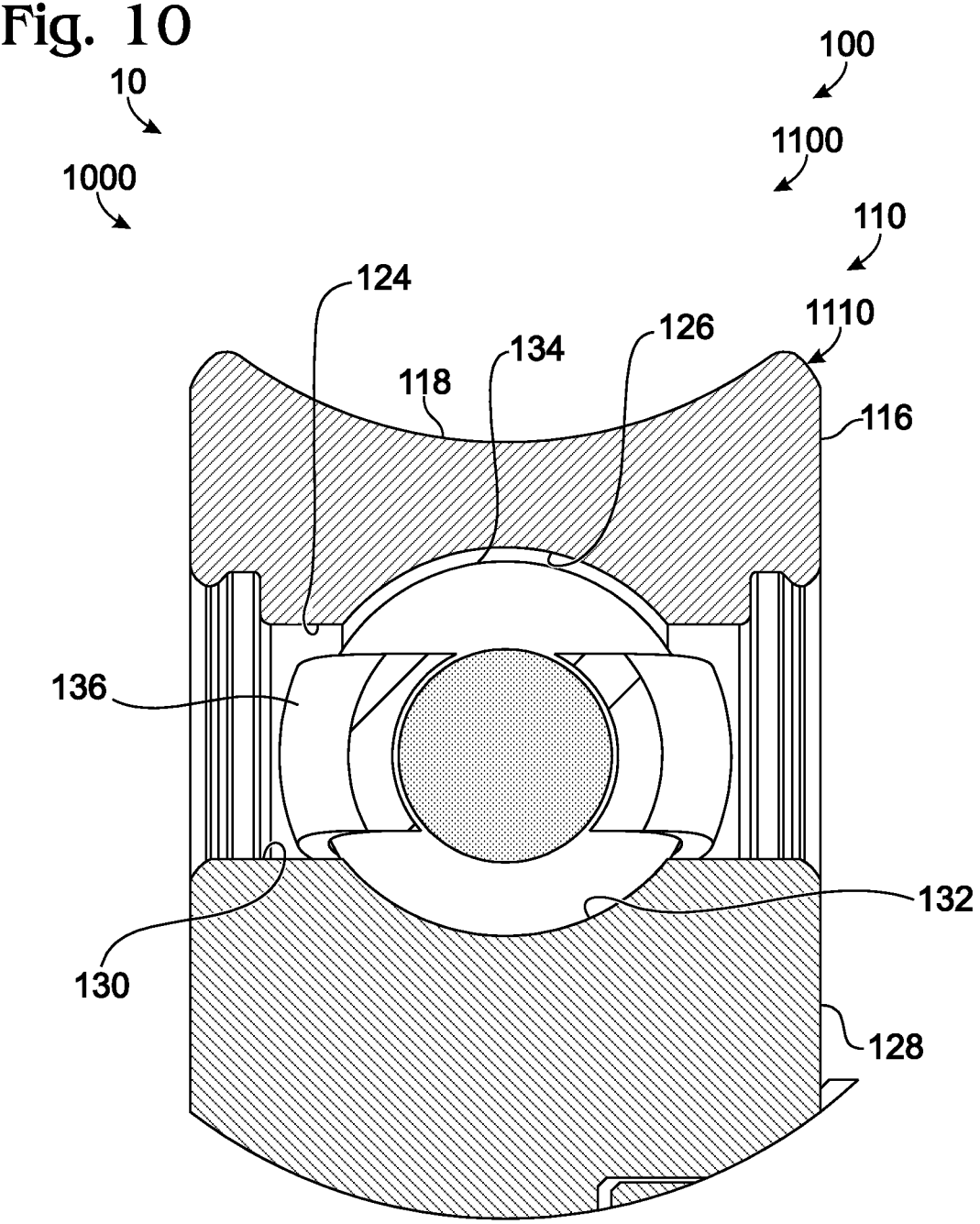
FIG. 10 is a fragmentary cross-sectional side view of a portion of the bearing assembly of the roller assembly of FIG. 5.

As illustrated in FIG. 10, outer race 116 of bearing assembly 1110 includes outer race inner contact surface 124 with outer race channel 126 configured for sliding or rolling engagement with rolling elements 134. As used herein, outer race channel 126 also may be referred to as an outer raceway 126. Outer race channel 126 may be a groove having a radius of curvature that is slightly larger than a radius of each of the plurality of rolling elements 134. For example, the radius of curvature of outer race channel 126 may be at least 1% greater, at least 5% greater, at least 10% greater, at least 20% greater, at least 30% greater, at most 35% greater, at most 25% greater, at most 15% greater, at most 7% greater, and/or at most 3% greater than a radius of each of the plurality of rolling elements 134. In this way, outer race channel 126 of outer race 116 may at least partially trap rolling elements 134 while permitting rolling elements 134 to freely roll or slide within outer race channel 126. For example, rolling elements 134 may be ball bearings having the standard designations 6206, 6207, or 6012, with diameters of approximately 0.375 inch (9.53 millimeter [mm]), 0.437 inch (11.1 mm), and 0.437 inch (11.1 mm), respectively. Rolling elements 134 may be any appropriate bearing elements, such as ball bearings, roller bearings, or needle bearings. Additionally, rolling elements 134 may be formed of any appropriate material, such as metal, plastic, ceramic, and/or other materials. Additionally, rolling elements 134 may have any appropriate size. For example, each of the plurality of rolling elements 134 may have a diameter that is at least 1 mm, at least 5 mm, at least 10 mm, at least 15 mm, at least 20 mm, less than 25 mm, less than 17 mm, less than 13 mm, less than 7 mm, and/or less than 3 mm.

Figure 9:
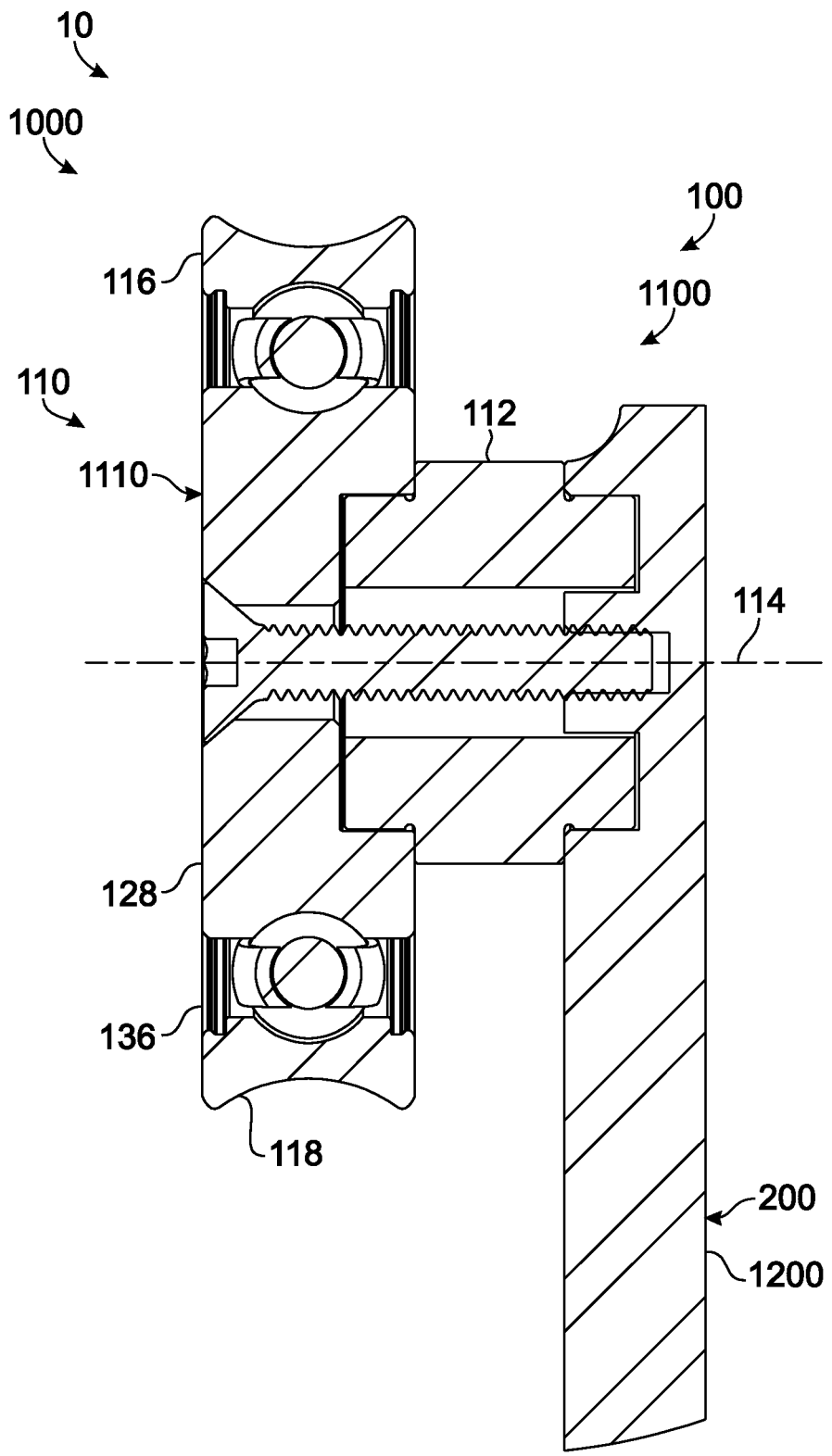
FIG. 9 is a fragmentary cross-sectional side view of a portion of the trolley assembly of the roller assembly of FIG. 5, taken along line 9-9 of FIG. 7.

As illustrated in FIG. 9, bracket 1200 is operatively connected to bearing assembly 1110 at inner race 128. With reference to FIG. 10, inner race 128 of bearing assembly 1110 has inner race outer surface 130 with inner race channel 132 that is configured for sliding or rolling engagement with rolling elements 134. As used herein, inner race channel 132 also may be referred to as an inner raceway 132. Inner race channel 132 may be a groove with a radius of curvature that is slightly larger than the radius of rolling elements 134. For example, the radius of curvature of inner race channel 132 may be at least 1% greater, at least 5% greater, at least 10% greater, at least 20% greater, at least 30% greater, at most 35% greater, at most 25% greater, at most 15% greater, at most 7% greater, and/or at most 3% greater than the radius of each of the plurality of rolling elements 134. The radius of curvature of inner race channel 132 may be substantially equal to the radius of curvature of outer race channel 126. In this way, inner race channel 132 may at least partially trap rolling elements 134, while permitting rolling elements 134 to freely roll or slide within the inner race channel 132.

As further illustrated in FIG. 9, bracket 1200 is operatively connected to inner race 128 via hub 112. Hub 112 sets bearing assembly 1110 away from bracket 1200 at a preset distance, such that bracket 1200 is appropriately positioned for attachment to panel 400. Hub 112 may be integrally formed with bracket 1200, or hub 112 and bracket 1200 may be distinct components. Similarly, hub 112 may be integrally formed with inner race 128.

Figure 7:
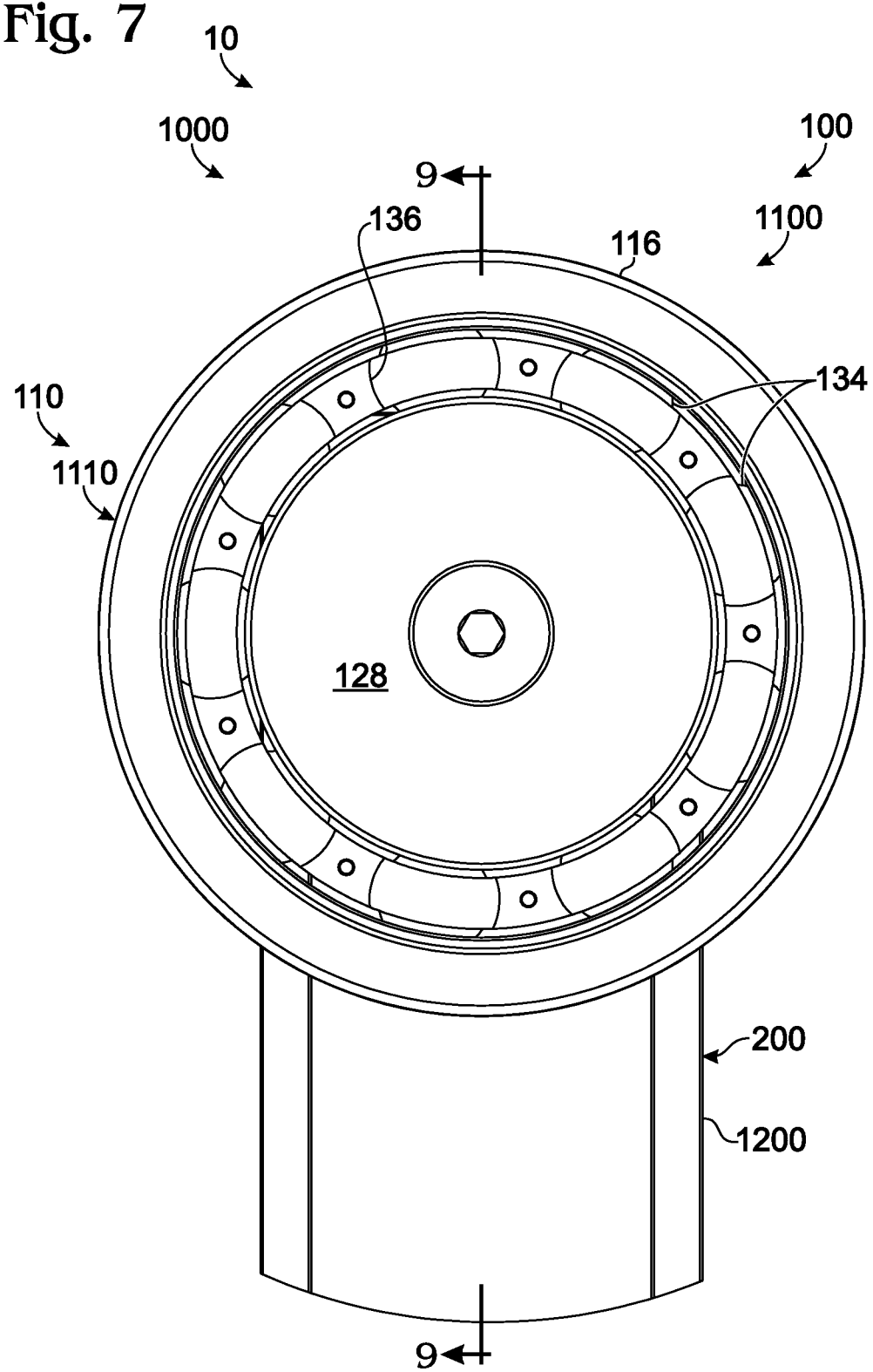
FIG. 7 is a fragmentary rear view of a portion of the trolley assembly of the roller assembly of FIG. 5.

As illustrated in FIGS. 7 and 10, cage 136 of bearing assembly 1110 partially encloses each of the plurality of rolling elements 134 and keeps each of the plurality of rolling elements 134 aligned for proper use. That is, cage 136 constrains each of the plurality of rolling elements 134 to roll in outer race channel 126 and in inner race channel 132. Additionally, cage 136 spaces apart each of the plurality of rolling elements 134 by a preset distance. For example, cage 136 ensures that an arc length between each pair of adjacent of rolling elements 134 is constant, such that rolling elements 134 are substantially equally spaced about inner race outer surface 130. Cage 136 also may be configured to maintain each of the plurality of rolling elements 134 in contact with a lubricant, such as oil or graphite. Additionally or alternatively, in embodiments of bearing assemblies 110 having roller bearings, cage 136 may help to keep the roller bearings aligned for proper use.

It is within the scope of the present disclosure that bearing mechanism 111 of bearing assemblies 110 additionally or alternatively includes a bushing and/or a sleeve to reduce a rolling resistance between outer race 116 and inner race 128, for example, without any roller elements.

In operation, outer race 116 may rotate and/or spin about bearing assembly axis 114. As outer race 116 spins, rolling elements 134 and cage 136 also spin about bearing assembly axis 114, with rolling elements 134 carrying outer race 116. In bearing assembly 1110, inner race 128 is rigidly connected to bracket 1200 via hub 112, such that inner race 128 does not spin and instead remains fixed with respect to bearing assembly axis 114. Alternatively, inner race 128 may not be rigidly connected to bracket 1200 and/or may be configured to rotate about bearing assembly axis 114.

Turning now to FIGS. 11-25, trolley 1100 with vertical panel adjustment mechanism 210 includes bracket 1200, bearing assembly 1110, upper dovetail pin 216, lower dovetail pin 212, upper adjustment channel 226 having upper installation opening 228, lower adjustment channel 222 having lower installation opening 224, and adjuster screw 230.

Bearing assembly 1110 is operatively connected to bracket 1200. Upper dovetail pin 216 is slidingly engaged with upper adjustment channel 226, and lower dovetail pin 212 is slidingly engaged with lower adjustment channel 222. Adjuster screw 230 is threaded into a threaded receiving hole 231 in bracket 1200, and acts upon lower dovetail pin 212 to locate lower dovetail pin 212 within lower adjustment channel 222.

Trolley 1100 includes vertical panel adjustment mechanism 210 and also includes upper pin sleeve 220, lower pin sleeve 214, cover plate 232, mounting plate 234, lower panel mounting fastener 236, and upper panel mounting fastener 238.

Figure 13:
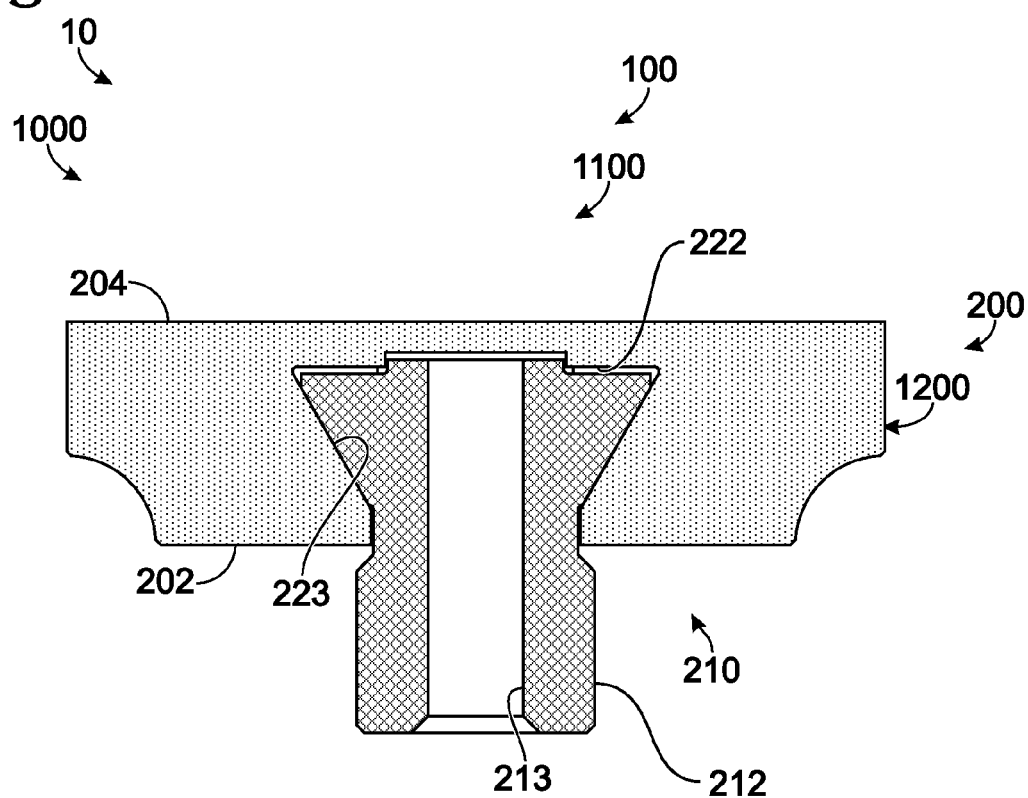
FIG. 13 is a cross-sectional top view of the trolley assembly of the roller assembly of FIG. 5, taken along line 13-13 of FIG. 11.
Figure 14:
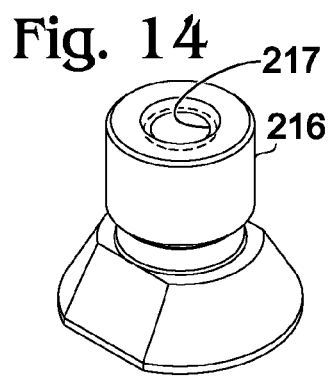
FIG. 14 is a perspective view of the upper dovetail pin of the roller assembly of FIG. 5.
Figure 15:
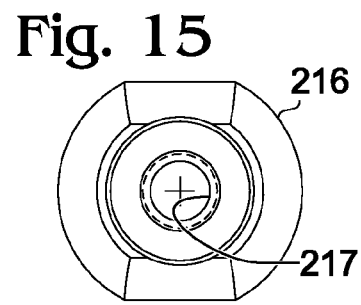
FIG. 15 is a top view of the upper dovetail pin of FIG. 14.
Figure 16:
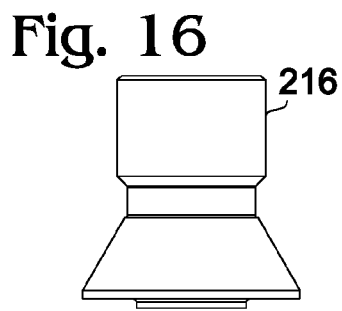
FIG. 16 is a left side view of the upper dovetail pin of FIG. 14.
Figure 17:
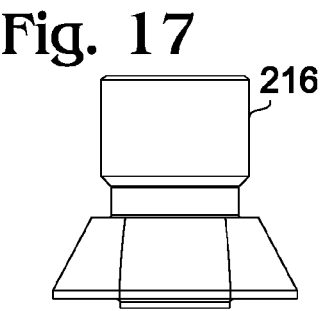
FIG. 17 is a front view of the upper dovetail pin of FIG. 14.
Figure 18:
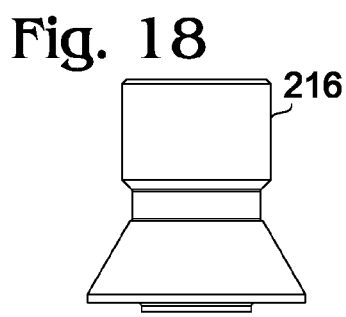
FIG. 18 is a right side view of the upper dovetail pin of FIG. 14.
Figure 19:
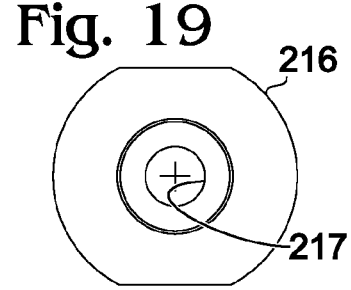
FIG. 19 is a bottom view of the upper dovetail pin of FIG. 14.
Figure 20:
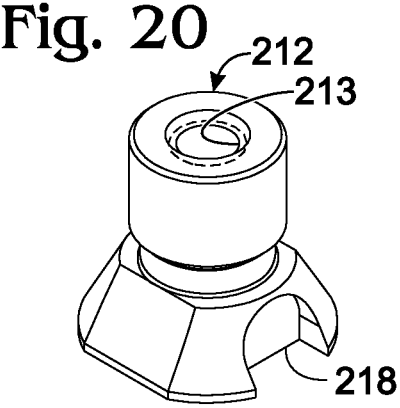
FIG. 20 is a perspective view of the lower dovetail pin of the roller assembly of FIG. 5.
Figure 21:
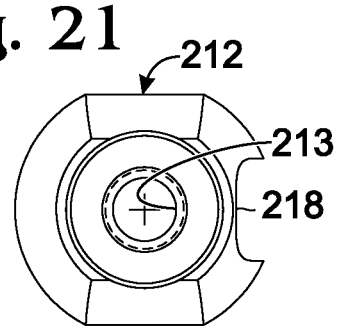
FIG. 21 is a top view of the lower dovetail pin of FIG. 20.
Figure 22:
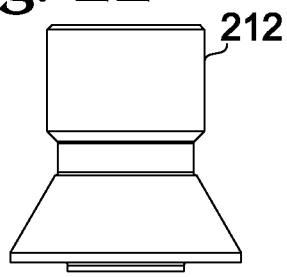
FIG. 22 is a left side view of the lower dovetail pin of FIG. 20.
Figure 23:
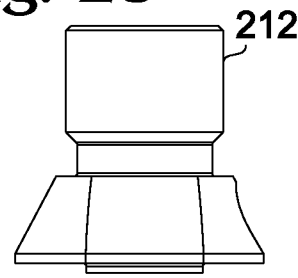
FIG. 23 is a front view of the lower dovetail pin of FIG. 20.
Figure 24:
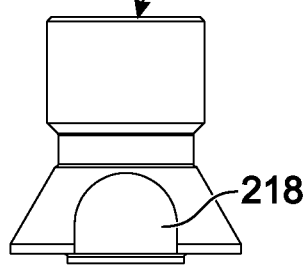
FIG. 24 is a right side view of the lower dovetail pin of FIG. 20.
Figure 25:
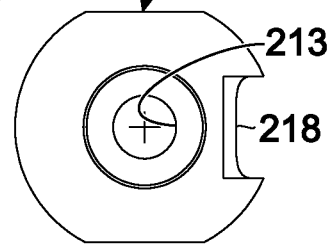
FIG. 25 is a bottom view of the lower dovetail pin of FIG. 20.

FIG. 13 illustrates a sliding fit between lower dovetail pin 212 and lower adjustment channel 222. While FIG. 13 is discussed in the context of lower dovetail pin 212 and lower adjustment channel 222, a sliding fit between upper dovetail pin 216 and upper adjustment channel 226 may be similarly configured. A clearance between lower dovetail pin 212 and lower adjustment channel 222 may be between about 0.005 inch (0.13 mm) and about 0.025 inch (0.64 mm), with the clearance between lower dovetail pin 212 and angled groove 223 being reduced even further, and even to zero, as lower panel mounting fastener 236 is tightly threaded into lower dovetail pin 212, thereby drawing lower dovetail pin 212 tightly against angled groove 223. That is, tightening lower panel mounting fastener 236 draws lower dovetail pin 212 toward panel 1400, thus wedging lower dovetail pin 212 into lower adjustment channel 222 and against angled groove 223.

Thus, a close fit between lower dovetail pin 212 and lower adjustment channel 222 reduces an amount that lower dovetail pin 212 may twist, rock, and/or move in lower adjustment channel 222, except in a direction of the sliding fit. Due to this constrained movement, panel 1400 may not move substantially relative to bracket 1200. In this way, rotating forces on trolley 1100 may be reduced or eliminated as force is exerted on panel 1400 to move panel 1400 across elongate rail 1300. In conventional systems, such forces may result in racking, or twisting, of a trolley, which may otherwise bind the trolley and prevent it from smoothly sliding along its rail or track. Moreover, by including the angled surfaces described above for lower dovetail pin 212 and lower adjustment channel 222 and for upper dovetail pin 216 and upper adjustment channel 226, racking may be reduced or eliminated, even in systems having clearances between the dovetail pin and the respective channel that are outside of the preferred ranges noted above.

FIGS. 14-19 illustrate an example of upper dovetail pin 216. Similarly, FIGS. 20-25 illustrate an example of lower dovetail pin 212. Lower dovetail pin 212 may be essentially identical to upper dovetail pin 216, except lower dovetail pin 212 may include adjuster screw contact surface 218, as illustrated in FIGS. 20-21 and FIGS. 24-25. Adjuster screw 230 may contact lower dovetail pin 212 at adjuster screw contact surface 218.

As illustrated in FIGS. 14-25, upper dovetail pin 216 and lower dovetail pin 212 each may include a generally frusto-conical portion and a generally cylindrical portion, wherein the generally frusto-conical portion and the generally cylindrical portion are axially aligned such that a circular end of the generally cylindrical portion abuts a narrower circular end of the generally frusto-conical portion.

With reference once again to FIGS. 11-12, to assemble vertical panel adjustment mechanism 210, upper dovetail pin 216 is inserted into upper adjustment channel 226 through upper installation opening 228, and lower dovetail pin 212 is inserted into lower adjustment channel 222 through lower installation opening 224. Cover plate 232 subsequently is installed over lower installation opening 224 and upper installation opening 228 to at least partially cover lower installation opening 224 and upper installation opening 228. Next, upper pin sleeve 220 is positioned over the cylindrical portion of upper dovetail pin 216, and lower pin sleeve 214 is positioned over the cylindrical portion of lower dovetail pin 212. Then, lower dovetail pin 212 with lower pin sleeve 214 and upper dovetail pin 216 with upper pin sleeve 220 are inserted into lower panel mounting hole 430 and upper panel mounting hole 432, respectively, in panel 1400. Next, mounting plate 234 is placed on an opposite side of panel 1400 from bracket 1200, such that panel 1400 is sandwiched between mounting plate 234 and bracket 1200. Then, lower panel mounting fastener 236 and upper panel mounting fastener 238 are inserted through mounting plate 234 and through panel 1400 to secure mounting plate 234 to the dovetail pins.

To utilize vertical panel adjustment mechanism 210 to adjust a vertical position of panel 1400, adjuster screw 230 acts upon lower dovetail pin 212 to raise or lower dovetail pin 212 within lower adjustment channel 222. A motion of lower dovetail pin 212 is transmitted to upper dovetail pin 216 as discussed above. To vertically raise panel 1400 relative to bracket 1200, adjuster screw 230 pushes lower dovetail pin 212 in a direction that is substantially opposite to the force of gravity, for example, by threading adjuster screw 230 into bracket 1200. Similarly, to lower panel 1400 relative to bracket 1200, adjuster screw 230 is moved vertically downward, for example, by at least partially unthreading adjuster screw 230 from bracket 1200, and the force of gravity may act on lower dovetail pin 212 to move lower dovetail pin 212 in a direction that is substantially the same as the force of gravity. In this way, vertical adjustments of lower dovetail pin 212, and thus of upper dovetail pin 216 and of panel 1400, are made.

Figure 26:
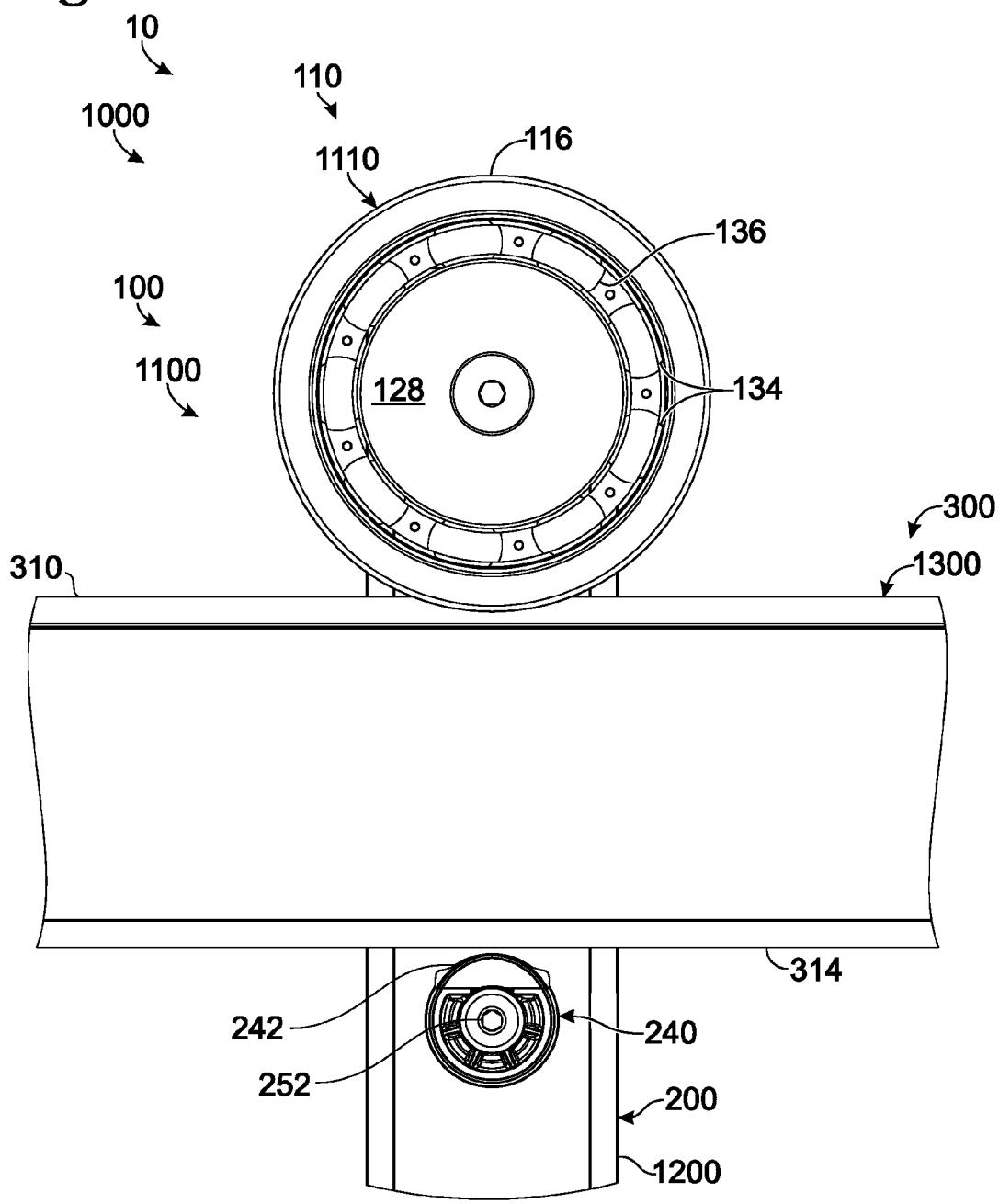
FIG. 26 is a fragmentary rear view of a portion of the roller assembly of FIG. 5.
Figure 27:
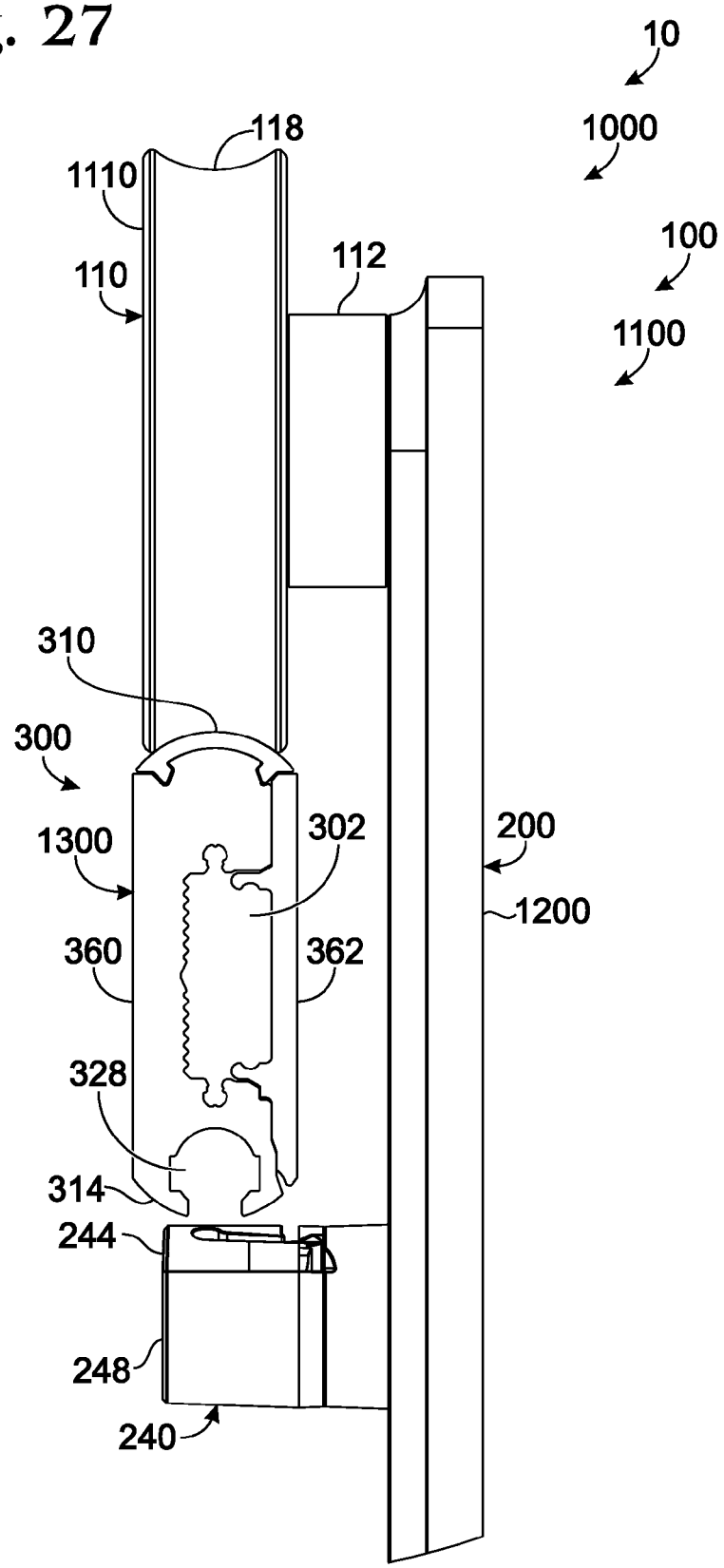
FIG. 27 is a fragmentary side view of a portion of the roller assembly of FIG. 5.
Figure 28:
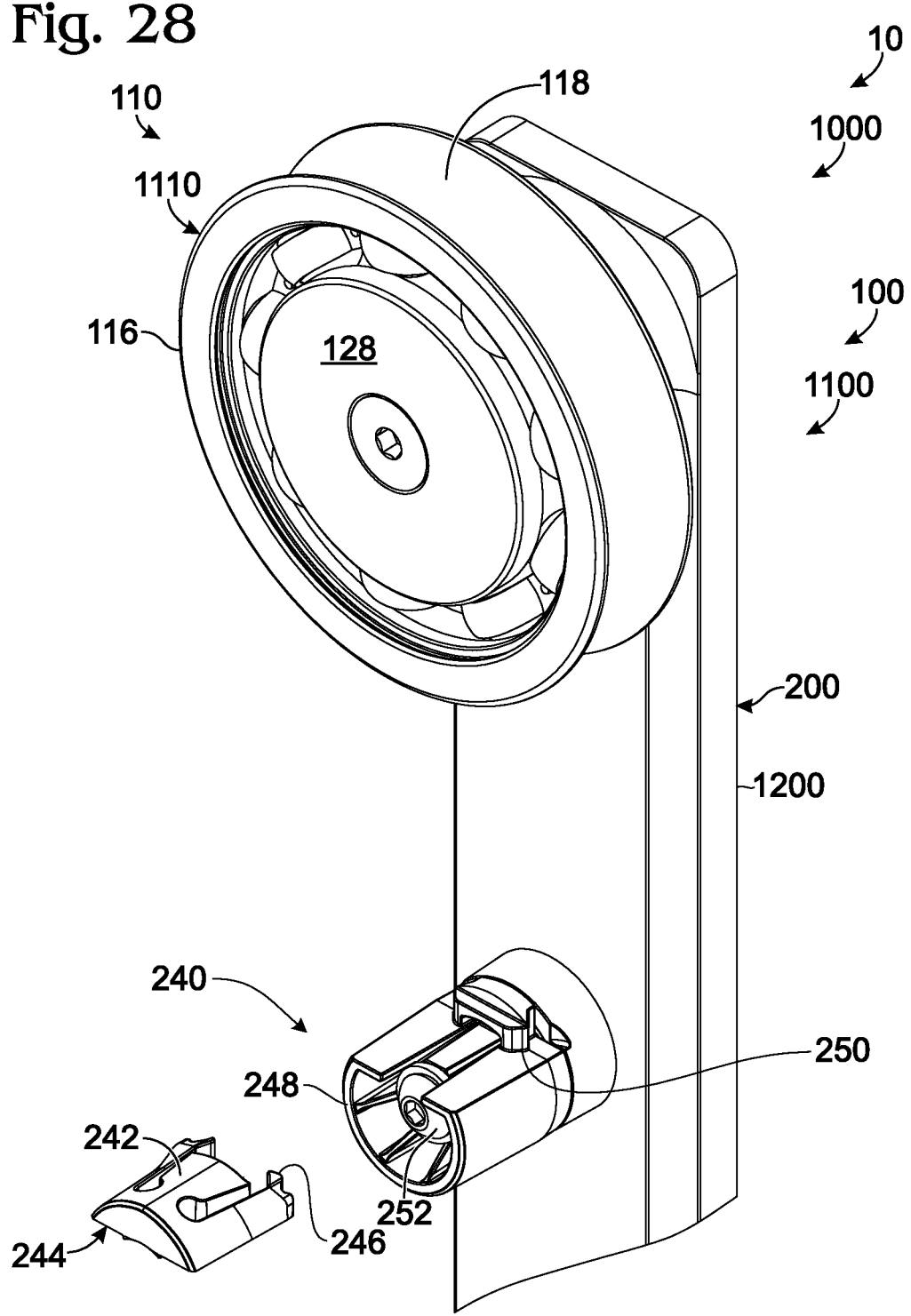
FIG. 28 is a fragmentary, partially exploded, perspective view of a portion of the roller assembly of FIG. 5.

Turning now to FIGS. 26-28, safety stop 240 is configured to inhibit trolley 1100 from being removed from elongate rail 1300, as described below. Safety stop 240 extends from bracket 1200 on the same side of bracket 1200 as bearing assembly 1110. Safety stop 240 is rigidly secured to bracket 1200 with a safety stop fastener 252.

Safety stop 240 may be substantially cylindrical; however, this is not necessary. As illustrated in FIG. 28, safety stop 240 has a safety stop outer surface 242 that is proximal bearing assembly 1110 when safety stop 240 is secured to bracket 1200.

Safety stop 240 is spaced apart from bearing assembly 1110, and elongate rail 1300 when trolley 1100 is operatively positioned on elongate rail 1300, by a specific distance. For example, and as discussed, safety stop 240 is configured to inhibit bearing assembly 1110 from lifting off of or otherwise disengaging from elongate rail 1300. That is, in use, trolley 1100 may be jarred or lifted due to external forces or collisions of panel 1400 and/or trolley 1100 with bumper stop 316 or with other objects. To inhibit such disengagement, safety stop 240 limits a distance by which bearing assembly 1110 may be lifted from elongate rail 1300. For example, when safety stop 240 is installed, a distance between bottom rail portion 314 of elongate rail 1300 and safety stop 240 is less than outer contact surface depth 120 of the outer race outer contact surface 118 of bearing assembly 1100. For example, the distance between bottom rail portion 314 and safety stop 240 may be at least 10% less, at least 20% less, at least 30% less, at least 40% less, at least 50% less, at least 60% less, at least 70% less, at least 80% less, at least 85% less, at most 75% less, at most 65% less, at most 55% less, at most 45% less, at most 35% less, and/or at most 25% less than outer contact surface depth 120 of outer race outer contact surface 118 when separable portion 244 is engaged with bracket-mounted portion 248 of safety stop 240. Accordingly, bearing assembly 1110 may not be removed from elongate rail 1300 without first removing or disengaging at least a portion of safety stop 240, such as separable portion 244, from bracket 1200 because outer race outer contact surface 118 of outer race 116 cannot be lifted over top rail portion 310 of elongate rail 1300.

As discussed, and with reference to FIG. 28, safety stop 240 of roller assembly 1000 includes a separable portion 244 and a bracket-mounted portion 248. In such an embodiment, safety stop 240 need not be removed from bracket 1200 in its entirety to install and/or remove trolley 1100 from elongate rail 1300. Instead, trolley 1100 may be installed and/or removed from elongate rail 1300 subsequent to removing separable portion 244 from safety stop 240. Thus, with separable portion 244 removed, the distance between elongate rail 1300 and an upper surface of bracket-mounted portion 248 of safety stop 240 is greater than or equal to outer contact surface depth 120 of the outer race outer contact surface 118. After trolley 1100 is installed on elongate rail 1300, separable portion 244 may be reconnected to the bracket-mounted portion 248, thereby causing the distance between elongate rail 1300 and safety stop 240 to be less than outer contact surface depth 120 of outer race outer contact surface 118. Separable portion 244 may be releasably connected to bracket-mounted portion 248 of safety stop 240 via at least one resilient tab 246 on the separable portion 244, which may engage a corresponding at least one tab receiver 250 on bracket-mounted portion 248 of safety stop 240.

Alternatively, safety stop 240 may not include separable portion 244 and/or may not be removable from bracket 1200. Safety stop 240 may operate by rotating, including by cam action, sliding, etc. with respect to bracket 1200 and/or elongate rail 1300. In this way, safety stop 240 may be moved toward and away from elongate rail 1300 without removing safety stop 240 from bracket 1200 and/or without removing a portion of safety stop 240. Accordingly, in some embodiments, safety stop 240 may be ovoid or may be shaped like a plate cam.

Safety stop 240 may be formed of any appropriate material, such as a plastic, a thermoplastic, a rubber, a dense rubber, and/or a synthetic rubber. Such materials may allow safety stop 240 to perform its functions without marring or otherwise damaging other parts of trolley 1100. Additionally or alternatively, safety stop 240 may operate in conjunction with bumper stop 316. For example, safety stop 240 may be configured to engage bumper stop 316 when trolley 1100 reaches the trolley stop point.

Figure 29:
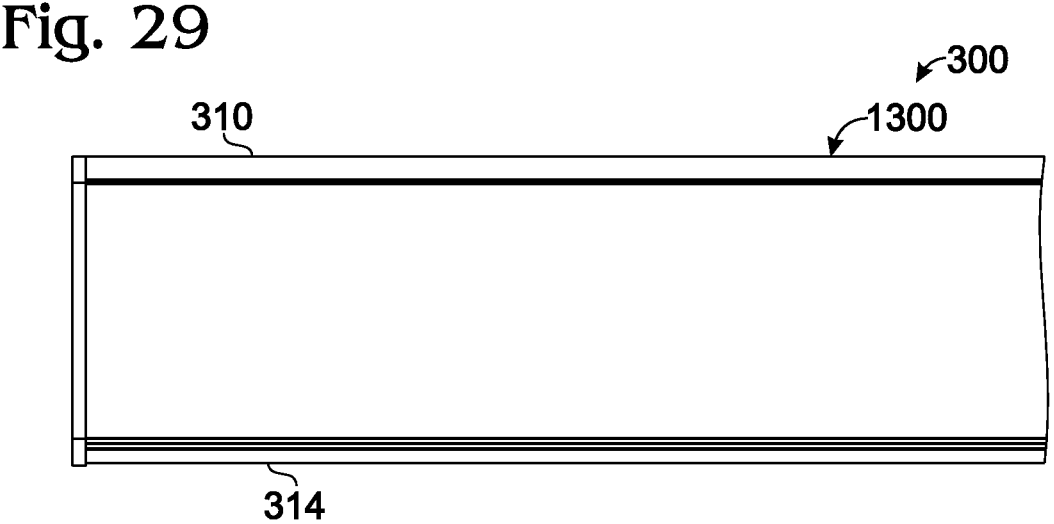
FIG. 29 is a fragmentary front view of the elongate rail of the roller assembly of FIG. 5, without the bumper stop.
Figure 30:
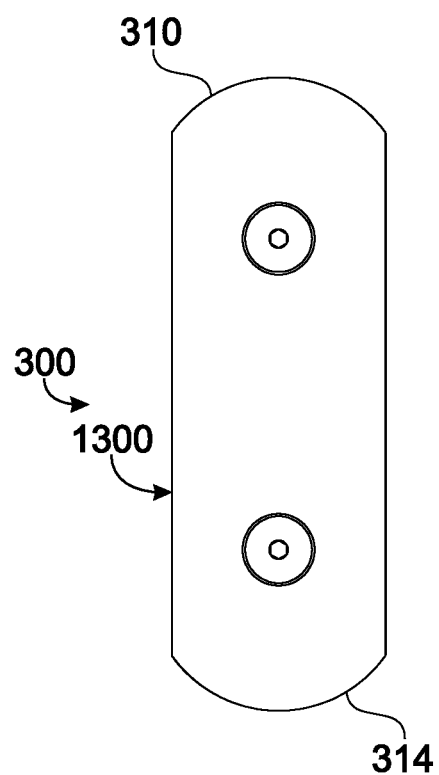
FIG. 30 is a side view of the elongate rail of the roller assembly of FIG. 5.

FIG. 29 illustrates a front view of elongate rail 1300. FIG. 30 illustrates a left-side view of elongate rail 1300. As illustrated in FIG. 30, elongate rail 1300 may have a cross-sectional profile of a rectangle with a rounded top rail portion 310 and a rounded bottom rail portion 314. A complementarity between elongate rail 1300 and outer race outer contact surface 118 of outer race 116 may provide the additional benefit of self-aligning the trolley. That is, a weight of trolley 1100 and panel 1400 may allow outer race outer contact surface 118 of outer race 116 to pivot, or rock, upon elongate rail 1300 until a center of gravity of trolley 1100 and panel 1400 is stable, such as with this pivoting action taking place about an axis that is longitudinally aligned with elongate rail 1300.

As discussed, top rail portion 310 of elongate rail 1300 may be made of metal or plastic. For example, top rail portion 310 may be made from plastic and outer race outer contact surface 118 may be made from metal. Such a configuration may provide for a quieter, smoother rolling action of outer race 116 along elongate rail 1300 relative to an embodiment in which top rail portion 310 and outer race 116 are both made from metal.

Figure 31:
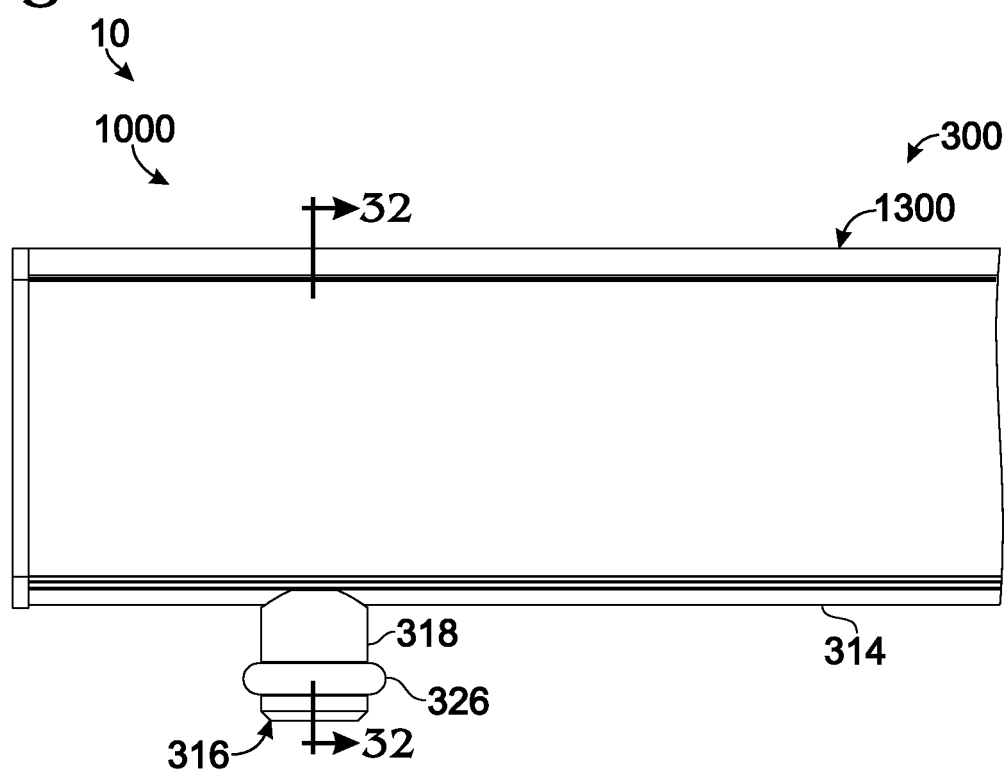
FIG. 31 is a fragmentary front view of the elongate rail with the bumper stop of the roller assembly of FIG. 5.
Figure 32:
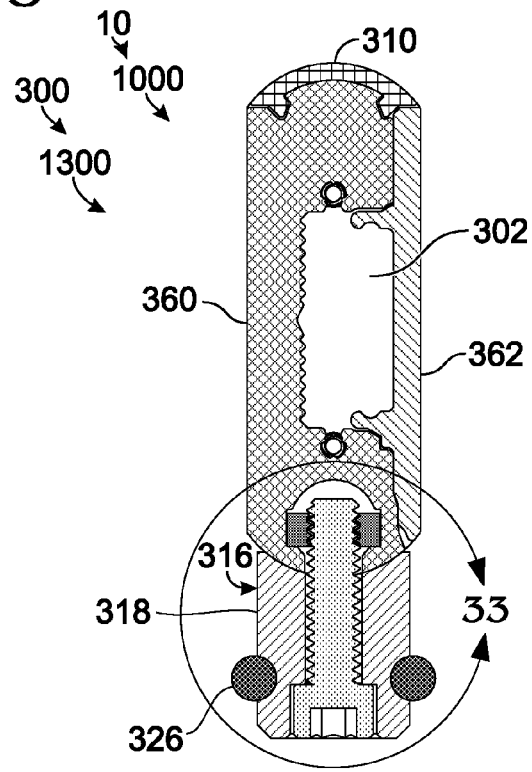
FIG. 32 is a cross-sectional side view of the elongate rail with the bumper stop of the roller assembly of FIG. 5, taken along line 32-32 of FIG. 31.
Figure 33:
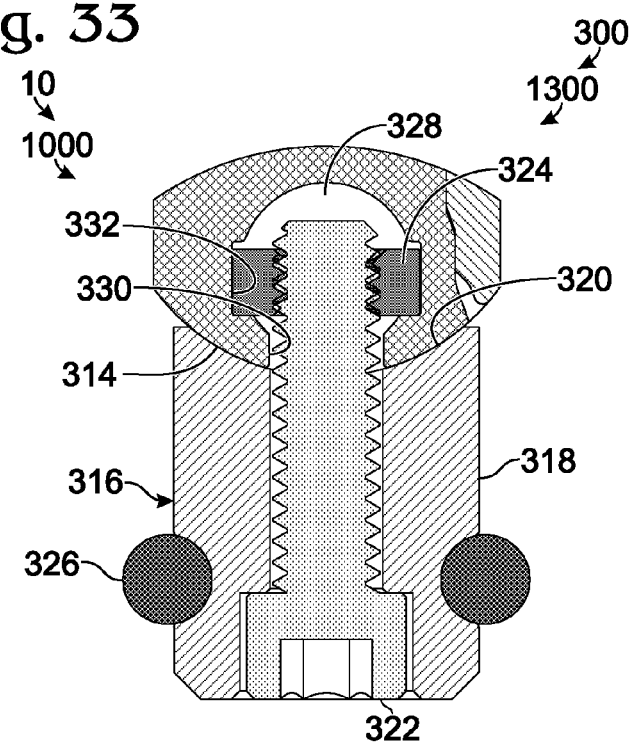
FIG. 33 is a fragmentary cross-sectional detail view of a portion of FIG. 32.

With reference to FIGS. 31-33, bumper stop 316 of roller assembly 1000 is slidingly connected to elongate rail 1300. As illustrated, bumper stop 316 of roller assembly 1000 includes a bumper body 318, a bumper fastener 322 extending at least partially into bumper body 318, a bumper nut 324 configured to engage and mate with bumper fastener 322, and a resilient guard 326 that wraps around bumper body 318. Resilient guard 326 may be configured to absorb shocks from objects, such as safety stop 240, striking bumper body 318. As illustrated in FIGS. 31-33, resilient guard 326 may be in the shape of a torus that wraps around bumper body 318.

With reference to FIGS. 32-33, bumper body 318 abuts against bottom rail portion 314 of elongate rail 1300, and bumper fastener 322 extends through bumper body 318 and into bumper nut 324, which is disposed in bumper slot 328. Bumper stop 316 may be located generally between elongate rail 1300 and panel 1400 when panel 1400 is coupled to bracket 1200 and when trolley 1100 is installed on elongate rail 1300.

Bumper body 318 may be generally cylindrical. Additionally or alternatively, bottom rail portion 314 may have a convex bottom surface, and an upper end of the bumper body 318 may define a bumper channel 320 with a shape that is complementary to the convex bottom surface of bottom rail portion 314. Alternatively, bumper body 318 may be generally in the shape of a rectangular prism or any other appropriate shape.

With continued reference to FIGS. 32-33, bumper nut 324 may be a hexagonal nut, and/or bumper fastener 322 may extend at least partially into bumper slot 328 and thread into bumper nut 324. Bumper slot 328 may have a cross-sectional profile with a vertical portion 330 extending generally parallel to a length of bumper fastener 322 and toward bumper body 318 and a horizontal portion 332 generally perpendicular to vertical portion 330. Horizontal portion 332 slidingly engages bumper nut 324, and has a width that is greater than a width of vertical portion 330 to retain bumper nut 324 within bumper slot 328. As shown in FIGS. 32-33, the width of horizontal portion 332 may be slightly larger than the width of bumper nut 324. In such a configuration, bumper nut 324 fits into horizontal portion 332 in such a manner that bumper nut 324 is permitted to be slid along bumper slot 328 when bumper fastener 322 is loosened, yet inhibited from rotating within bumper slot 328. Accordingly, bumper fastener 322 may be tightly threaded into bumper nut 324 without a user having to temporarily retain bumper nut 324 in place such as with a hand and/or a wrench.

In use, bumper fastener 322 may be loosened by at least partially unthreading bumper fastener 322 from bumper nut 324, which may create a space between bumper body 318 and bottom rail portion 314 of elongate rail 1300. Thus, bumper stop 316 may be slid within bumper slot 328 to any desired location along elongate rail 1300. At the desired location, bumper fastener 322 may then be tightened into bumper nut 324. This draws bumper body 318 tightly against bottom rail portion 314 of elongate rail 1300, providing a clamping force to inhibit further movement of bumper stop 316 relative to elongate rail 1300 unless bumper fastener 322 is again loosened.

Once positioned, bumper stop 316 inhibits movement of trolley 1100 past bumper stop 316 by contacting safety stop 240 and inhibiting safety stop 240 from further travel in the blocked direction. In this way, a sliding movement of panel 1400 may be limited by a user-selected position of bumper stop 316.

Advantageously, this configuration permits bumper stop 316 to be slid continuously along an entire length of elongate rail 1300. By contrast, in conventional designs, a conventional stop is not capable of sliding past the conventional track's mounting hardware and/or cannot be positioned at the same point along the track as the conventional track's mounting hardware.

FIGS. 34-39 generally illustrate elongate rail 1300 with rail adjustment mechanism 334. Detachable face plate 362 is not illustrated in FIG. 34 so that the interior of elongate rail 1300 is visible.

As discussed, and with reference to FIGS. 34-39, rail mounting hole 356 extends through integral face plate 360 of elongate rail 1300, and rail fastener 348 extends through adjuster plate 338 and rail mounting hole 356 to secure elongate rail 1300 to surface 20.

Figure 35:
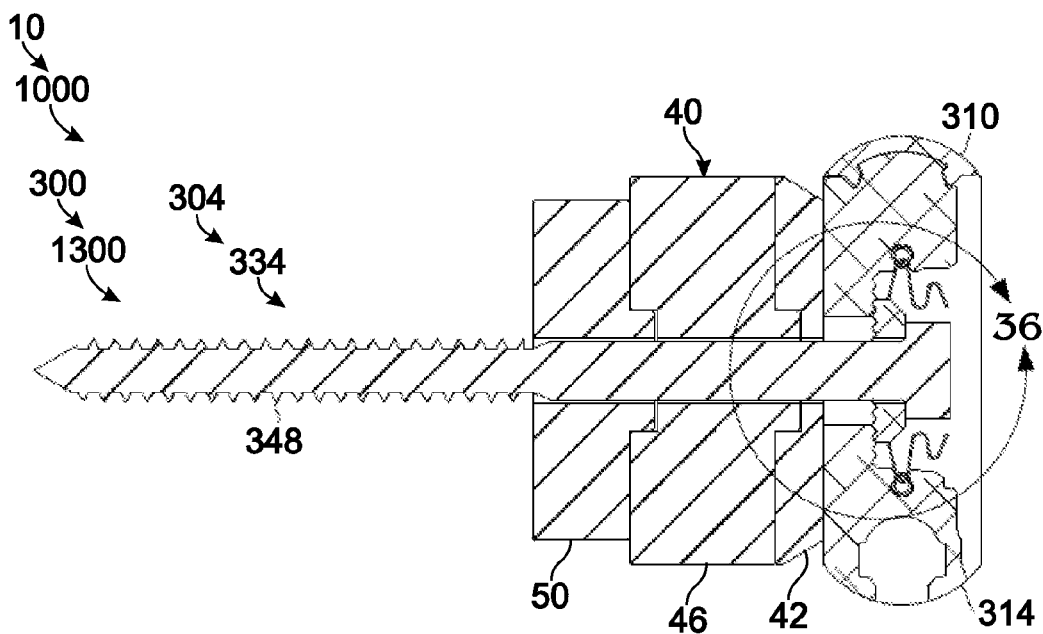
FIG. 35 is a cross-sectional side view of the elongate rail and the dry wall mount of the roller assembly of FIG. 5.
Figure 36:
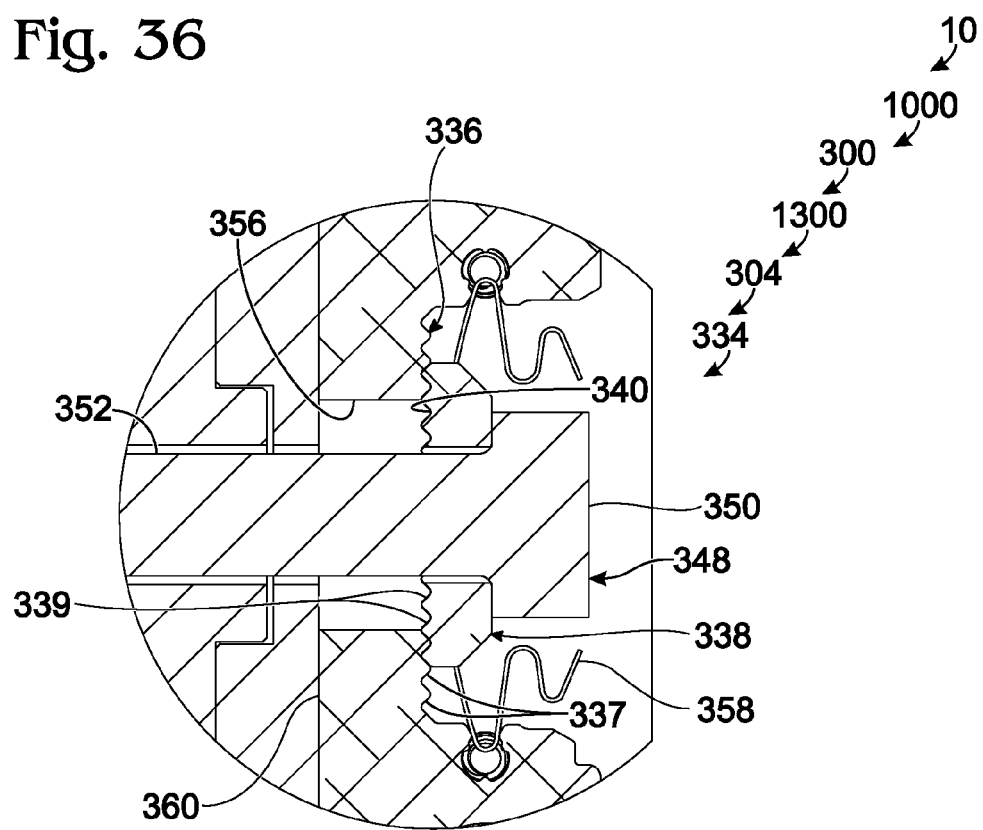
FIG. 36 is a fragmentary cross-sectional detail view of a portion of FIG. 35.
Figure 37:
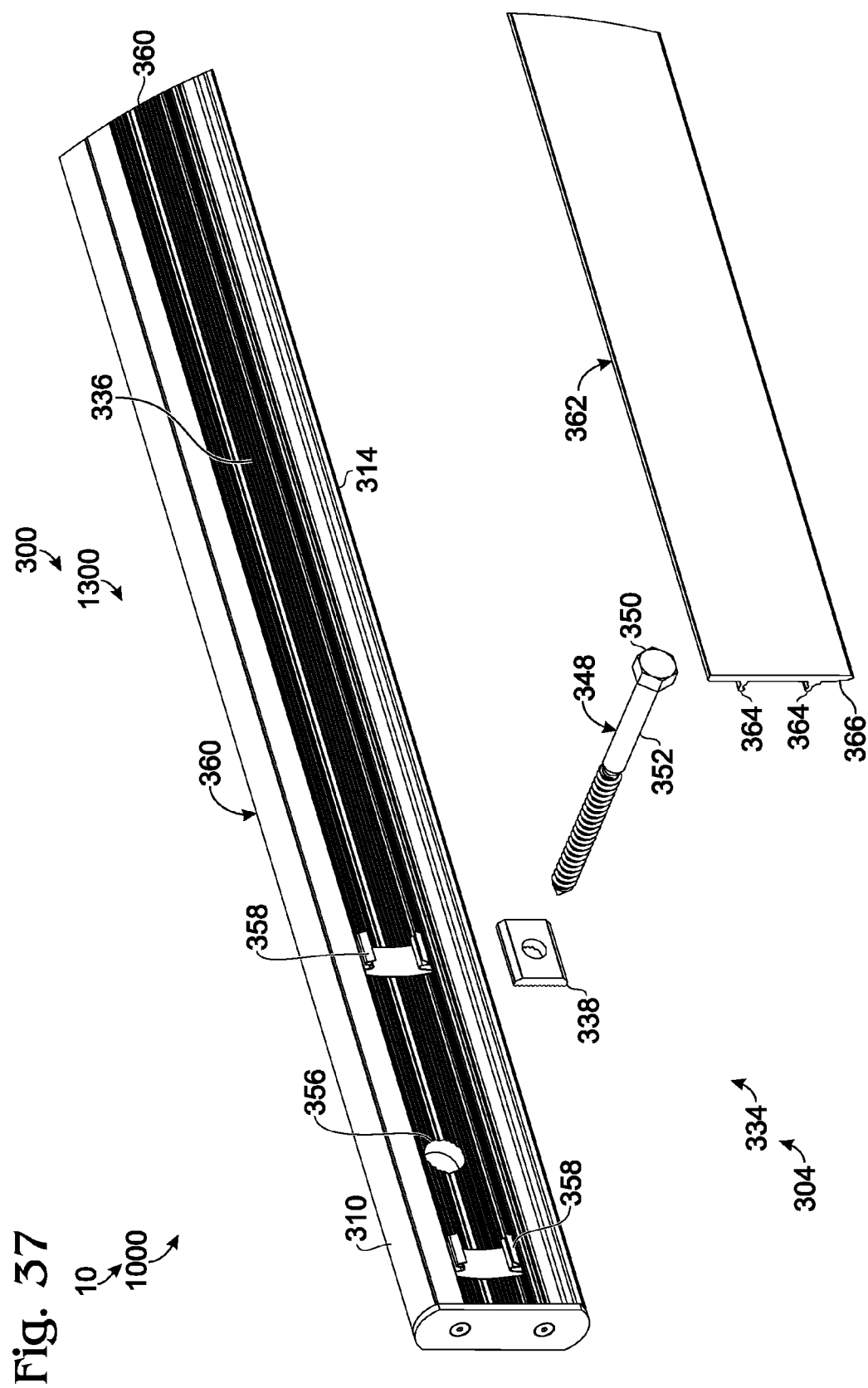
FIG. 37 is an exploded fragmentary perspective view of a portion of the elongate rail of the roller assembly of FIG. 5.

As discussed, adjustment face 336 may be attached to integral face plate 360 of elongate rail 1300, or may be integrally formed with integral face plate 360. As illustrated in FIGS. 34-37, adjustment face 336 of elongate rail 1300 includes a series of essentially parallel adjustment face ridges 337 projecting from integral face plate 360 toward rail cavity 302. Similarly, adjuster plate face 340 of adjuster plate 338 has a series of essentially parallel adjuster plate ridges 339 projecting from adjuster plate 338, which are configured to mesh with adjustment face ridges 337, for example as shown in FIGS. 35-36. Adjustment face ridges 337 and adjuster plate ridges 339 are sized and/or otherwise configured to permit incremental adjustment of a position and/or orientation of elongate rail 1300 in a direction that is generally perpendicular to adjustment face ridges 337, with an adjustment increment that is an integer multiple of a distance between adjacent adjustment face ridges 337.

Figure 34:
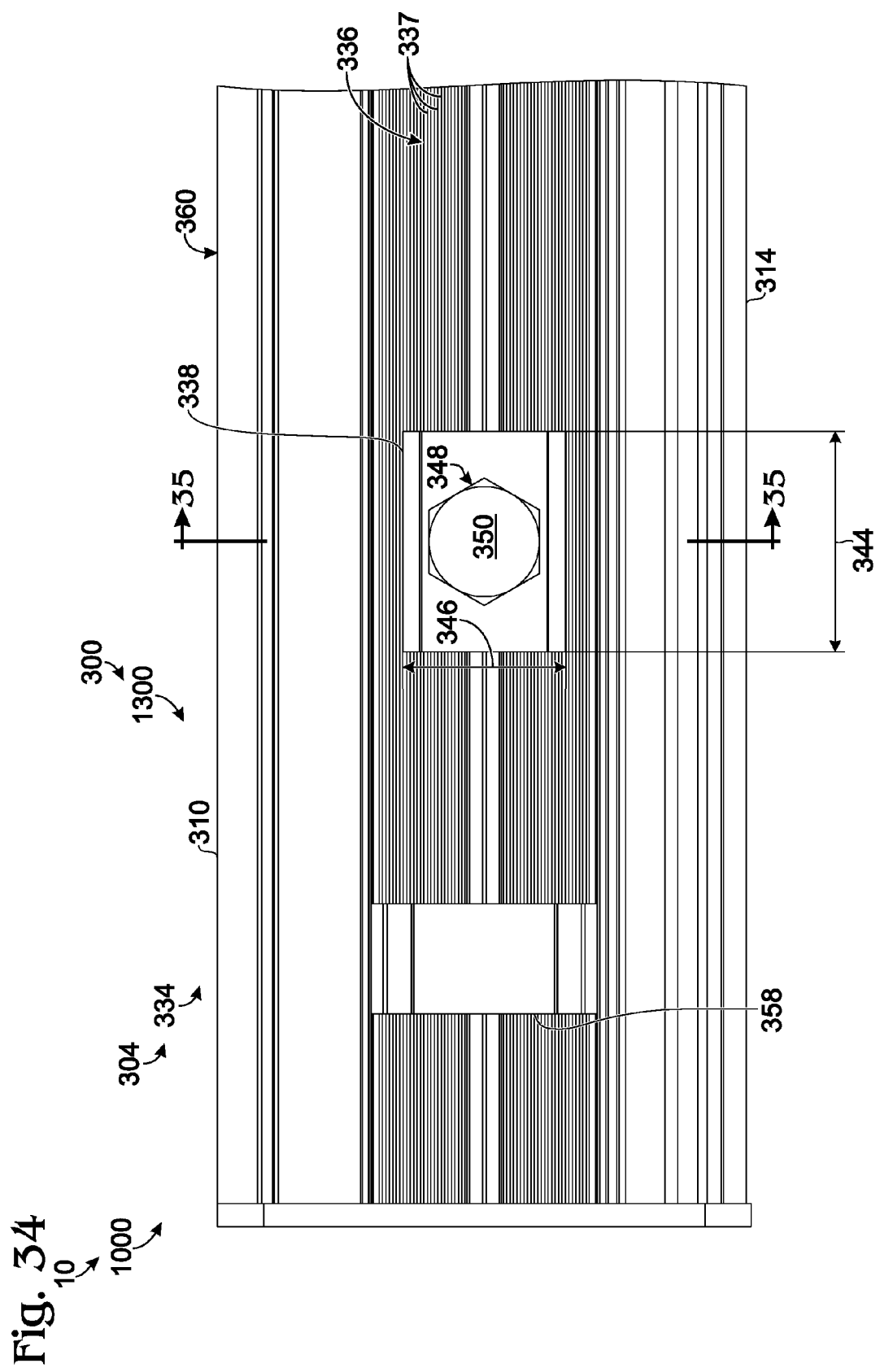
FIG. 34 is a fragmentary front view of a portion of the elongate rail of the roller assembly of FIG. 5.

With reference to FIG. 34, adjuster plate 338 may be generally rectangular and may have an adjuster plate width 344 and an adjuster plate height 346. Adjuster plate width 344 and/or adjuster plate height 346 may be greater than the diameter of rail mounting hole 356, such that adjuster plate 338 may be too large to pass through rail mounting hole 356 of elongate rail 1300. Additionally, adjuster plate mounting hole 342 of adjuster plate 338 may be sufficiently small to inhibit fastener head 350 from being pulled through rail mounting hole 356.

Hence, elongate rail 1300 may be mounted to surface 20 by way of rail fastener 348 passing through adjuster plate 338. For example, a user may partially mount elongate rail 1300, such as by partially threading rail fastener 348 into surface 20 without fully tightening rail fastener 348. A space between fastener body 352 and rail mounting hole 356 may allow the user to make small, indexed adjustments to a vertical position of elongate rail 1300. For example, a portion of elongate rail 1300 may need to be moved slightly up, down, left, and/or right with respect to surface 20 in order to properly position and/or level elongate rail 1300. Once elongate rail 1300 is in a desired position and/or orientation with respect to surface 20, rail fastener 348 may be fully tightened. When rail fastener 348 is fully tightened, fastener head 350 of rail fastener 348 forces adjuster plate 338 fully against adjustment face 336 of integral face plate 360, thereby inhibiting further movement of adjuster plate 338 relative to adjustment face 336.

If further adjustments are desired, rail fastener 348 may be at least partially loosened so as to permit relative movement between the adjustment face ridges 337 and adjuster plate ridges 339. Thus, adjustment face 336 may be slid in a direction generally parallel to adjuster plate ridges 339, such as to adjust a horizontal position of elongate rail 1300 with respect to surface 20. Additionally or alternatively, with rail fastener 348 at least partially loosened, adjustment face 336 may be shifted incrementally in a direction substantially perpendicular to adjuster plate ridges 339, such as to adjust a vertical position of elongate rail 1300 with respect to surface 20.

As discussed, and as illustrated in FIGS. 34-37, elongate rail 1300 may include one or more face plate clips 358, which may engage corresponding face plate attachment tabs 364 on a face plate rear 366 of detachable face plate 362 to hold detachable face plate 362 in place on elongate rail 1300. In this way, rail mounting hole 356 may be drilled essentially at any point along the length of elongate rail 1300 to suit the user's needs and/or preferences, for example, to align with wall studs or other attachment points of surface 20, and detachable face plate 362 may be mounted to elongate rail 1300 to conceal rail adjustment system 304, and/or a rail adjustment mechanism 334 thereof, from view. That is, elongate rail 1300 is configured to conceal the mounting hardware for elongate rail 1300 and roller assembly 100 from view.

Figure 38:
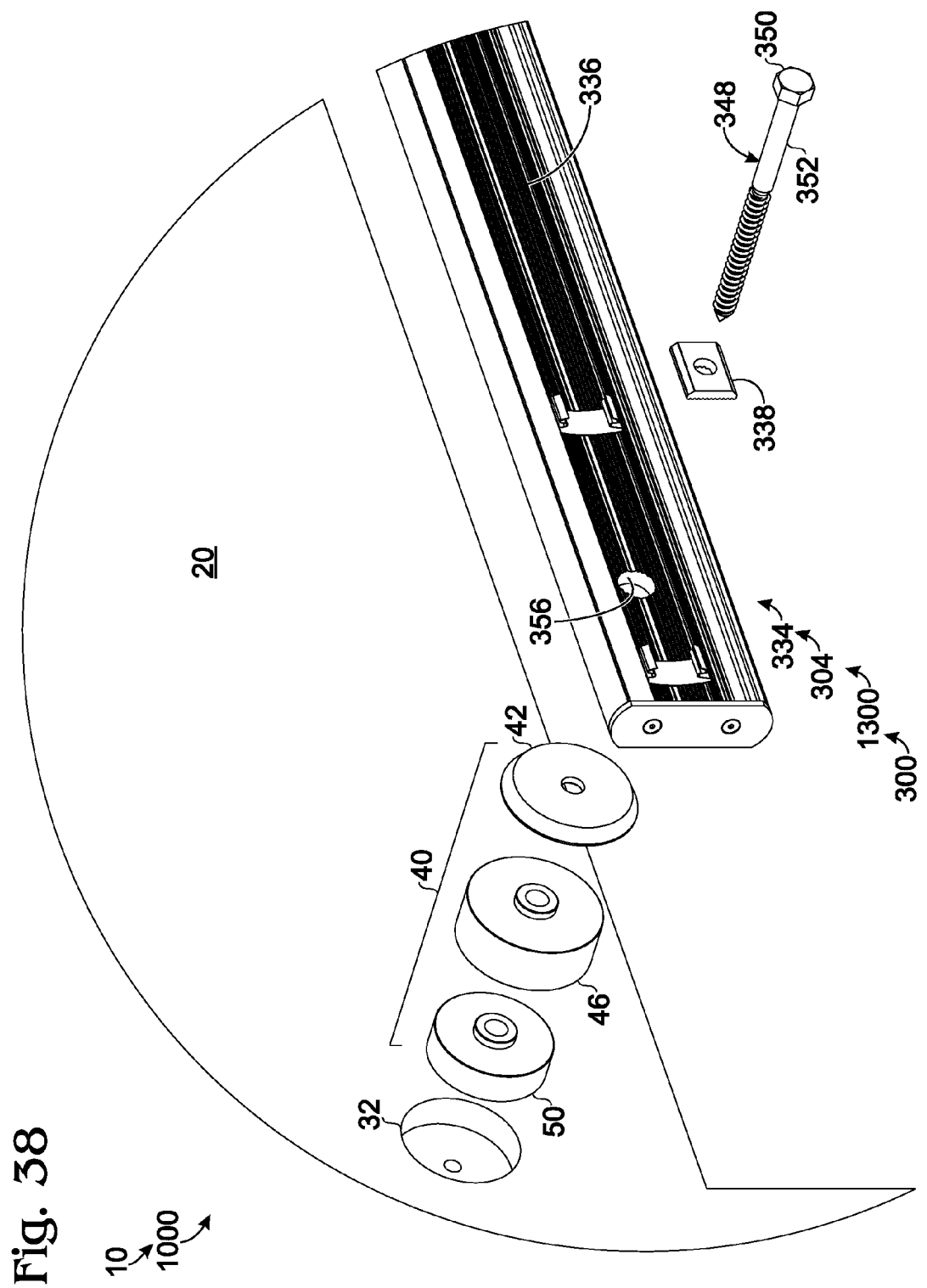
FIG. 38 is an exploded fragmentary perspective view of the elongate rail and dry wall mount of the roller assembly of FIG. 5, shown with a surface to which the elongate rail may be mounted.
Figure 39:
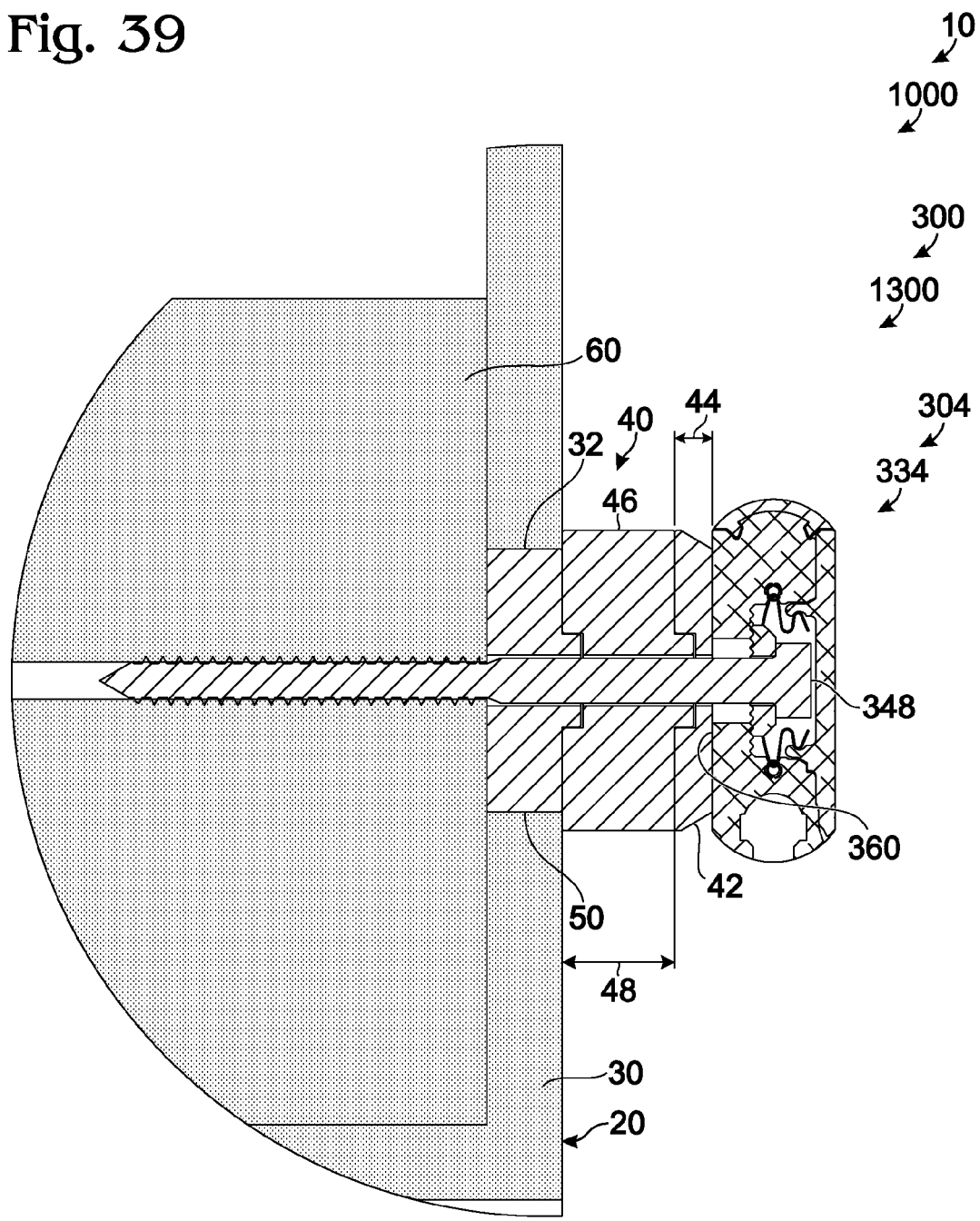
FIG. 39 is a fragmentary cross-sectional side view of the elongate rail and dry wall mount of the roller assembly of FIG. 5, shown mounted to a surface.

As illustrated in FIGS. 38-39, roller assembly 10 and/or first illustrative example 1000 of roller assembly 10 may include a drywall mount 40. As illustrated in FIGS. 38-39, drywall mount 40 may include rail fastener 348, a spacer plate 42, a spacer block 46, and/or a bracing block 50.

Each of spacer plate 42, spacer block 46, and bracing block 50 includes a hole through which rail fastener 348 may be inserted. Rail fastener 348 has a length that extends beyond the bracing block 50 to, for example, be threaded into a wall stud 60 or another structural member within surface 20 and/or drywall 30.

Bracing block 50 may be generally cylindrical with an outer diameter that is substantially equal to a diameter of a drywall installation hole 32 bored into drywall 30. In this way, bracing block 50 may fit snugly in drywall installation hole 32. Thus, when installed, bracing block 50 may distribute a load carried by rail fastener 348 over a relatively larger surface area since a peripheral surface area of bracing block 50 may be greater than a peripheral surface area of rail fastener 348. The load carried by rail fastener 348 may be, for example, that portion of a combined weight of elongate rail 1300, trolley 1100, and/or panel 1400 carried by rail fastener 348. Accordingly, small movements of rail fastener 348 may be less likely to compress drywall 30 in the region surrounding drywall installation hole 32 when bracing block 50 is installed in drywall 30.

With reference to FIG. 39, spacer block 46 may be generally cylindrical with an outer diameter and a spacer block length 48. In conjunction with spacer plate 42, spacer block 46 provides a space, or a standoff distance, between drywall 30 and elongate rail 1300. The outer diameter of spacer block 46 may be larger than the outer diameter of bracing block 50. In such embodiments, spacer block 46 may provide additional structural integrity to help inhibit compression of drywall 30 in a region surrounding drywall installation hole 32 when rail fastener 348 is carrying a load. The larger outer diameter of spacer block 46 may also facilitate installation since bracing block 50 may be pushed into drywall installation hole 32 until spacer block 46 contacts drywall 30.

Spacer plate 42 may be generally cylindrical, or may be a tapered cylinder having an outer diameter and a spacer plate thickness 44. Spacer plate thickness 44 may be significantly less than the outer diameter of spacer plate 42. In conjunction with spacer block 46, spacer plate 42 may provide a space, or a standoff distance, between drywall 30 and elongate rail 1300. Spacer plate 42 may contact integral face plate 360 of elongate rail 1300 when elongate rail 1300 is mounted to a surface 20. Spacer plate 42 may be integrally formed with spacer block 46, or spacer plate 42 and spacer block 46 may be distinct components.

Spacer plate 42, spacer block 46, and bracing block 50 may be formed of any appropriate materials, such as plastic, metal, or dense rubber, including synthetic rubber. Suitable plastics include thermoplastics, such as polyoxymethylene, or acetal, a version of which is sold under the trademark DELRIN.

It is within the scope of the present disclosure that drywall mount 40 may not include each of spacer plate 42, spacer block 46, and bracing block 50. For example, drywall mount 40 may include spacer plate 42 and spacer block 46 but not bracing block 50. Alternatively, drywall mount 40 may not include spacer plate 42.

In some embodiments, bracing block 50 may interconnect with spacer block 46 and/or spacer block 46 may interconnect with spacer plate 42. Such interconnection may be, for example, through engagement between a step on one component and a corresponding recess in another component. For example, and as illustrated in FIG. 39, spacer block 46 may include a step that mates with a corresponding recess in spacer plate 42. Similarly, spacer block 46 may include a recess that mates with a corresponding step on bracing block 50. Accordingly, such interlocking components may help to reduce an amount of force exerted on rail fastener 348.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities, should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

It is believed that the disclosure herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure or subsequently filed claims recite "a" or "a first" element or the equivalent thereof, such claims should be understood to include incorporation of one or more such elements, neither requiring nor excluding two or more such elements.

Examples of roller assemblies and associated methods according to the present disclosure are presented in the following enumerated paragraphs:

A1. A roller assembly for supporting a hanging panel, the roller assembly comprising:
- an elongate rail configured to be mounted on a surface, wherein the elongate rail has a top rail portion that is generally horizontal and a bottom rail portion that is parallel, or at least substantially parallel, to the top rail portion; and
- at least one trolley assembly configured to move along the elongate rail and to support the hanging panel, wherein the trolley assembly includes a bearing assembly configured to translate the trolley assembly along the top rail portion and a bracket operatively coupled to the bearing assembly and configured to be operatively coupled to the hanging panel for sliding the hanging panel along the elongate rail.

A2. The roller assembly of paragraph A1, wherein the bracket is configured to be operatively coupled to an upper panel edge of the hanging panel.

A3. The roller assembly of any of paragraphs A1-A2, wherein the bracket is configured to be operatively coupled to a panel face of the hanging panel.

A4. The roller assembly of any of paragraphs A1-A3, wherein the elongate rail further includes a detachable face plate and an integral face plate, wherein the detachable face plate and the integral face plate are coupled together in a rail-assembled configuration, wherein the detachable face plate and the integral face plate define a rail cavity therebetween in the rail-assembled configuration, and wherein the detachable face plate is configured to be separated from a remainder of the elongate rail to expose the rail cavity in a rail-disassembled configuration.

A5. The roller assembly of paragraph A4, wherein the integral face plate is proximal the surface relative to the detachable face plate when the elongate rail is mounted on the surface.

A6. The roller assembly of paragraph A4, wherein the integral face plate is distal the surface relative to the detachable face plate when the elongate rail is mounted on the surface.

A7. The roller assembly of any of paragraphs A4-A6, wherein the detachable face plate includes a face plate rear that faces generally toward the rail cavity in the rail-assembled configuration, wherein the detachable face plate includes at least one face plate attachment tab positioned on the face plate rear, and wherein the elongate rail includes at least one face plate clip configured to engage the at least one face plate attachment tab to operatively secure the detachable face plate to the integral face plate in the rail-assembled configuration.

A8. The roller assembly of any of paragraphs A1-A7, wherein the elongate rail has a side profile with at least one of a rectangular shape, a rectangular shape with rounded ends, a circular shape, an elliptical shape, an arch shape, a U-shape, a rounded top edge, a rounded bottom edge, a substantially flat top edge, and a substantially flat bottom edge.

A9. The roller assembly of any of paragraphs A1-A8, wherein the top rail portion includes a top rail groove extending longitudinally along the elongate rail.

A10. The roller assembly of any of paragraphs A1-A9, wherein at least a portion of the elongate rail is formed of at least one of a plastic, a thermoplastic, polyoxymethylene, acetal, a metal, aluminum, steel, copper, brass, gold, and silver.

A11. The roller assembly of any of paragraphs A1-A10, wherein the top rail portion is formed of at least one of a plastic, a thermoplastic, polyoxymethylene, acetal, a metal, aluminum, steel, copper, brass, gold, and silver.

A12. The roller assembly of any of paragraphs A1-A11, wherein the surface is a generally vertical wall.

A13. The roller assembly of any of paragraphs A1-A12, wherein the surface is a generally horizontal ceiling.

A14. The roller assembly of any of paragraphs A1-A13, wherein the elongate rail includes a rail adjustment system configured to facilitate adjusting at least one of a position of the elongate rail and an orientation of the elongate rail with respect to the surface, wherein the rail adjustment system is concealed in the rail-assembled configuration, and wherein the rail adjustment system includes at least two spaced-apart rail adjustment mechanisms.

A15. The roller assembly of paragraph A14, wherein each rail adjustment mechanism includes:
- an adjustment face with a series of adjustment face ridges that are parallel, or at least substantially parallel, to the top rail portion;
- an adjuster plate with one or more adjuster plate ridges configured to engage the adjustment face ridges of the adjustment face, an adjuster plate face opposite the adjuster plate ridges, and an adjuster plate mounting hole extending through the adjuster plate; and a rail fastener configured to couple the elongate rail to the surface by extending through the adjuster plate mounting hole and through the adjustment face to operatively engage the adjuster plate ridges with the adjustment face ridges to restrict movement of the adjuster plate relative to the adjustment face.

A16. The roller assembly of paragraph A15, wherein each adjuster plate mounting hole is generally aligned with a corresponding rail mounting hole that extends through the elongate rail when the elongate rail is mounted on the surface; wherein the rail mounting hole has a diameter that is greater than a diameter of the adjuster plate mounting hole; and wherein the rail fastener passes through the adjuster plate mounting hole and the rail mounting hole to mount the elongate rail to the surface.

A17. The roller assembly of paragraph A16, wherein the rail fastener has a fastener head with a width that is greater than the diameter of the adjuster plate mounting hole and a fastener body with a width that is smaller than the width of the fastener head and that is smaller than the diameter of the rail mounting hole; wherein the fastener body is at least partially threaded; and wherein the fastener head engages the adjuster plate face to retain the adjuster plate against a portion of the adjustment face when the elongate rail is mounted to the surface.

A18. The roller assembly of paragraph A17, wherein the diameter of the rail mounting hole is at least one of at least 1.25 times, at least 1.5 times, at least 1.75 times, at least 2 times, at least 2.25 times, at least 2.5 times, less than 3 times, less than 2.75 times, less than 2.3 times, less than 2.1 times, less than 1.8 times, less than 1.6 times, and less than 1.3 times the width of the fastener body.

A19. The roller assembly of any of paragraphs A15-A18, wherein the adjustment face is coupled to a/the integral face plate.

A20. The roller assembly of any of paragraphs A15-A18, wherein the adjustment face is integrally formed with a/the integral face plate.

A21. The roller assembly of any of paragraphs A15-A20, wherein the adjustment face ridges project from a/the integral face plate toward a/the rail cavity.

A22. The roller assembly of any of paragraphs A15-A21, wherein each of the adjustment face ridges has at least one of a triangular profile and a sawtooth profile.

A23. The roller assembly of any of paragraphs A15-A22, wherein each of the adjuster plate ridges has at least one of a triangular profile and a sawtooth profile.

A24. The roller assembly of any of paragraphs A15-A23, wherein the adjuster plate is at least one of generally rectangular and generally square.

A25. The roller assembly of any of paragraphs A15-A24, wherein the adjuster plate has an adjuster plate width and an adjuster plate height, and wherein a/the diameter of a/the rail mounting hole is smaller than at least one of the adjuster plate width and the adjuster plate height.

A26. The roller assembly of any of paragraphs A1-A25, wherein the elongate rail includes a bumper stop positioned on the bottom rail portion configured to limit a range of motion of at least one of the trolley assembly and the hanging panel, wherein a location of the bumper stop along the bottom rail portion defines a trolley assembly stop point corresponding to a limit of the range of motion, and wherein the location of the bumper stop is continuously adjustable along substantially an entire length of the elongate rail.

A27. The roller assembly of paragraph A26, wherein the location of the bumper stop is configured to be continuously adjustable without obstruction by and without interference with a/the rail adjustment mechanism.

A28. The roller assembly of any of paragraphs A26-A27, wherein the location of the bumper stop is configured to be continuously adjustable without obstruction by and without interference with an object within the elongate rail.

A29. The roller assembly of any of paragraphs A26-A28, wherein the location of the bumper stop is configured to be continuously adjustable without obstruction by and without interference with mounting hardware for mounting the elongate rail on the surface.

A30. The roller assembly of any of paragraphs A26-A29, wherein the bumper stop includes a bumper body, a bumper fastener extending at least partially into the bumper body, and a bumper nut configured to engage the bumper fastener.

A31. The roller assembly of any of paragraphs A26-A30, wherein the bumper stop is located generally between the elongate rail and the hanging panel when the hanging panel is coupled to the bracket and when the trolley assembly is installed on the elongate rail.

A32. The roller assembly of any of paragraphs A26-A31, wherein the bumper stop is coupled to the bottom rail portion.

A33. The roller assembly of any of paragraphs A26-A32, wherein the bottom rail portion includes a bumper slot extending longitudinally along the elongate rail, wherein the bumper slot has a cross-sectional profile with a vertical portion extending generally parallel to a/the bumper fastener and toward a/the bumper body and a horizontal portion generally perpendicular to the vertical portion.

A34. The roller assembly of paragraph A33, wherein the bumper slot extends along substantially an entire length of the bottom rail portion.

A35. The roller assembly of any of paragraphs A33-A34, wherein the vertical portion is configured to slidingly engage a/the bumper nut.

A36. The roller assembly of any of paragraphs A33-A35, wherein the horizontal portion has a width that is greater than a width of the vertical portion.

A37. The roller assembly of any of paragraphs A30-A36, wherein the bumper nut is a hexagonal nut, and wherein the bumper fastener is a threaded fastener configured to thread into the bumper nut.

A38. The roller assembly of any of paragraphs A30-A37, wherein the bumper stop is configured to be translated along a length of the bottom rail portion while the bumper fastener is at least partially engaged with the bumper nut.

A39. The roller assembly of any of paragraphs A30-A38, wherein the bottom rail portion has a convex bottom surface, and wherein a top surface of the bumper body defines a bumper channel with a shape that is complementary to the convex bottom surface.

A40. The roller assembly of any of paragraphs A30-A39, wherein the bumper stop further includes a resilient guard that covers at least a portion of the bumper body, wherein the resilient guard is configured to absorb shocks from objects striking the bumper body.

A41. The roller assembly of paragraph A40, wherein the resilient guard is in the shape of a torus, and wherein the resilient guard wraps around the bumper body.

A42. The roller assembly of any of paragraphs A30-A41, wherein the bumper body is generally in the shape of a cylinder.

A43. The roller assembly of any of paragraphs A30-A41, wherein the bumper body is generally in the shape of a rectangular prism.

A44. The roller assembly of any of paragraphs A1-A43, wherein the bracket includes an interior bracket face that generally faces the hanging panel when the hanging panel is installed on the bracket, an exterior bracket face opposite the interior bracket face, and a vertical panel adjustment mechanism configured to adjust a position of the hanging panel with respect to the bracket in a generally vertical direction, wherein the vertical panel adjustment mechanism includes:
    an adjustment channel recessed into the bracket from the interior bracket face and extending in a generally vertical direction; and
    a dovetail pin positioned in the adjustment channel and extending from the interior bracket face;
wherein the adjustment channel includes an angled groove with a tapered cross-sectional profile that tapers toward the interior bracket face; wherein the adjustment channel is configured to retain the dovetail pin at least partially within the bracket; wherein the dovetail pin is configured to slidingly engage with the adjustment channel; and wherein the dovetail pin is configured to be inserted into a corresponding panel mounting hole on the hanging panel.

A45. The roller assembly of paragraph A44, wherein the vertical panel adjustment mechanism further includes an adjuster screw extending into the bracket from a bottom end of the bracket, wherein the adjuster screw engages the dovetail pin, and wherein the adjuster screw is configured to adjust a vertical position of the dovetail pin along the adjustment channel.

A46. The roller assembly of any of paragraphs A44-A45, wherein the adjustment channel includes an installation opening at at least one of a top end and a bottom end of the adjustment channel, wherein the installation opening is configured to permit the dovetail pin to be inserted into the adjustment channel.

A47. The roller assembly of any of paragraphs A44-A46, wherein the adjustment channel is a lower adjustment channel, wherein the dovetail pin is a lower dovetail pin, wherein the panel mounting hole is a lower panel mounting hole, wherein the lower adjustment channel includes a lower installation opening, wherein the hanging panel further includes an upper panel mounting hole positioned generally vertically above the lower panel mounting hole, wherein the vertical adjustment mechanism further includes an upper adjustment channel including an upper installation opening and positioned generally vertically above the lower adjustment channel and an upper dovetail pin positioned in the upper adjustment channel and extending from the interior bracket face, and wherein the upper dovetail pin is configured to be inserted into the upper panel mounting hole.

A48. The roller assembly of paragraph A47, wherein a/the adjuster screw engages the lower dovetail pin.

A49. The roller assembly of any of paragraphs A47-A48, wherein the adjuster screw is configured to locate the lower dovetail pin within the lower adjustment channel.

A50. The roller assembly of any of paragraphs A47-A49, wherein the lower dovetail pin and the upper dovetail pin are operatively coupled to one another.

A51. The roller assembly of any of paragraphs A47-A50, wherein the adjuster screw is configured to push the lower dovetail pin in a direction that is substantially opposite a force of gravity.

A52. The roller assembly of any of paragraphs A47-A51, wherein the lower dovetail pin includes an adjuster screw contact surface configured to engage a/the adjuster screw.

A53. The roller assembly of any of paragraphs A47-A52, wherein the lower dovetail pin includes a threaded recess configured to receive a lower panel mounting fastener, and wherein the upper dovetail pin includes a threaded recess configured to receive an upper panel mounting fastener.

A54. The roller assembly of any of paragraphs A47-A53, wherein the upper dovetail pin and the lower dovetail pin each include a generally frusto-conical portion and a generally cylindrical portion, wherein the generally frusto-conical portion and the generally cylindrical portion are axially aligned such that a circular end of the generally cylindrical portion abuts a narrower circular end of the generally frusto-conical portion.

A55. The roller assembly of paragraph A54, wherein the upper adjustment channel and the lower adjustment channel each include the angled groove, and wherein the angled groove is configured to slidingly engage the generally frusto-conical portion of the corresponding upper dovetail pin and lower dovetail pin.

A56. The roller assembly of any of paragraphs A47-A55, wherein the angled groove is configured to limit a range of motion of the upper dovetail pin with respect to the upper adjustment channel and of the lower dovetail pin with respect to the lower adjustment channel.

A57. The roller assembly of any of paragraphs 47-A56, wherein the vertical panel adjustment mechanism further includes an upper pin sleeve coupled to the upper dovetail pin and a lower pin sleeve coupled to the lower dovetail pin, wherein the upper pin sleeve and the lower pin sleeve are configured to provide at least one of a physical barrier and a mechanical barrier between the upper dovetail pin and the hanging panel and between the lower dovetail pin and the hanging panel when the upper dovetail pin is inserted into the upper panel mounting hole and the lower dovetail pin is inserted into the lower panel mounting hole.

A58. The roller assembly of paragraph A57, wherein the upper pin sleeve circumferentially surrounds at least a portion of the upper dovetail pin, and wherein the lower pin sleeve circumferentially surrounds at least a portion of the lower dovetail pin.

A59. The roller assembly of any of paragraphs A57-A58, wherein the upper pin sleeve and the lower pin sleeve are generally cylindrical.

A60. The roller assembly of any of paragraphs A57-A59, wherein the upper pin sleeve and the lower pin sleeve are configured to at least one of damp vibrations and attenuate vibrations propagating between the upper dovetail pin and the hanging panel and between the lower dovetail pin and the hanging panel.

A61. The roller assembly of any of paragraphs A57-A60, wherein the upper pin sleeve and the lower pin sleeve include at least one of glass, wood, plastic, thermoplastic, polyoxymethylene, acetal, rubber, synthetic rubber, a material that is softer than the hanging panel, and a metal.

A62. The roller assembly of any of paragraphs A47-A61, wherein the vertical panel adjustment mechanism further includes a cover plate positioned at least partially over at least one of the upper adjustment channel and the lower adjustment channel to at least one of inhibit the upper dovetail pin from being removed from the upper adjustment channel and inhibit the lower dovetail pin from being removed from the lower adjustment channel.

A63. The roller assembly of paragraph A62, wherein the cover plate at least partially covers at least one of the upper installation opening and the lower installation opening.

A64. The roller assembly of any of paragraphs A62-A63, wherein the cover plate is configured to facilitate a vertical translation of the hanging panel with respect to the bracket when the cover plate is in contact with the hanging panel and with the bracket and when a/the lower panel mounting fastener and a/the upper panel mounting fastener are at least partially loosened.

A65. The roller assembly of any of paragraphs A62-A64, wherein a surface of the cover plate that faces the hanging panel includes at least one of a plastic, a high-density polyethylene (HDPE), a fine surface finish, a fine surface roughness, and a low-friction surface.

A66. The roller assembly of any of paragraphs A62-A65, wherein the cover plate is fastened to the bracket.

A67. The roller assembly of paragraph A66, wherein the cover plate is at least one of glued, cemented, and adhered to the bracket.

A68. The roller assembly of any of paragraphs A44-A67, wherein the vertical panel adjustment mechanism further includes a mounting plate configured to be positioned on an opposite side of the hanging panel relative to the bracket, wherein the mounting plate is configured to distribute a clamping force from one or more panel mounting fasteners to the hanging panel.

A69. The roller assembly of paragraph A68, wherein the mounting plate includes at least one mounting plate aperture configured to receive a corresponding panel mounting fastener of the one or more panel mounting fasteners, wherein each corresponding panel mounting fastener is configured to retain the mounting plate against the hanging panel.

A70. The roller assembly of any of paragraphs A47-A69, when dependent upon paragraph A45 and any of paragraphs A68-A69, wherein the mounting plate is configured to transmit a motion of the lower dovetail pin to the upper dovetail pin responsive to an adjustment of a position of the lower dovetail pin via contact with the adjuster screw.

A71. The roller assembly of any of paragraphs A1-A70, wherein the bearing assembly includes an outer race with an outer race outer contact surface configured to contact the top rail portion, an inner race concentric with the outer race, and a bearing mechanism located generally between the outer race and the inner race; wherein the outer race is configured to rotate about a bearing assembly axis; wherein the bearing mechanism is configured to contact the outer race and the inner race to reduce a rolling resistance therebetween.

A72. The roller assembly of paragraph A71, wherein the outer race is configured to rotate with respect to the inner race.

A73. The roller assembly of any of paragraphs A71-A72, wherein the outer race is configured to move along the top rail portion without slipping.

A74. The roller assembly of any of paragraphs A71-A73, wherein the bearing mechanism includes, and optionally is, a plurality of rolling elements located between and generally in contact with each of the outer race and the inner race, and wherein the bearing assembly further includes a cage configured to retain the plurality of rolling elements between the outer race and the inner race.

A75. The roller assembly of paragraph A74, wherein the plurality of rolling elements are configured to revolve about the bearing assembly axis while the outer race rotates about the bearing assembly axis.

A76. The roller assembly of any of paragraphs A71-A75, wherein the outer race outer contact surface is concave, and wherein the outer race outer contact surface has an outer contact surface radius of curvature and an outer contact surface depth as measured from a portion of the outer race outer contact surface that is proximal the bearing assembly axis to a portion of the outer race outer contact surface that is distal the bearing assembly axis.

A77. The roller assembly of paragraph A76, wherein the outer race outer contact surface has a cross-sectional profile that generally corresponds to a cross-sectional shape of the top rail portion.

A78. The roller assembly of any of paragraphs A76-A77, wherein the outer contact surface radius of curvature is slightly greater than a rail radius of curvature of the top rail portion.

A79. The roller assembly of paragraph A78, wherein the outer contact surface radius of curvature is at least one of at least 1% greater, at least 5% greater, at least 10% greater, at least 20% greater, at least 30% greater, at least 40% greater, at least 50% greater, at least 60% greater, at least 70% greater, at least 80% greater, at least 90% greater, at most 100% greater, at most 85% greater, at most 75% greater, at most 65% greater, at most 55% greater, at most 45% greater, at most 35% greater, at most 25% greater, at most 15% greater, at most 7% greater, and at most 3% greater than the rail radius of curvature.

A80. The roller assembly of any of paragraphs A76-A79, wherein the outer contact surface radius of curvature is generally constant.

A81. The roller assembly of any of paragraphs A76-A80, wherein the outer race outer contact surface has a cross-sectional shape that is generally semi-circular.

A82. The roller assembly of any of paragraphs A76-A79, wherein the outer contact surface radius of curvature is not constant.

A83. The roller assembly of paragraph A82, wherein the outer race outer contact surface has a cross-sectional shape that is at least one of arch-shaped, U-shaped, parabolic, hyperbolic, V-shaped, rectangular, and trapezoidal.

A84. The roller assembly of any of paragraphs A71-A83, wherein the outer race is at least partially, and optionally completely, formed of at least one of plastic, metal, aluminum, steel, copper, brass, gold, and silver.

A85. The roller assembly of any of paragraphs A71-A84, wherein the outer race includes an outer race body and an outer race surface portion, wherein the outer race body and the outer race surface portion are formed of different materials.

A86. The roller assembly of paragraph A85, wherein the outer race surface portion is an outer surface coating applied to the outer race body.

A87. The roller assembly of any of paragraphs A85-A86, wherein the outer race body is formed at least substantially of metal, and wherein the outer surface coating includes at least one of a plastic, a thermoplastic, polyoxymethylene, and acetal.

A88. The roller assembly of any of paragraphs A85-A87, wherein the outer race body and the outer race surface portion are mechanically connected.

A89. The roller assembly of any of paragraphs A85-A88, wherein the outer race surface portion includes, and optionally is, a replaceable wear surface.

A90. The roller assembly of any of paragraphs A74-A89, when dependent on paragraph A74, wherein each of the plurality of rolling elements is at least one of a ball bearing, a roller bearing, and a needle bearing, and wherein each of the plurality of rolling elements has the same, or substantially the same, diameter.

A91. The roller assembly of any of paragraphs A74-A90, when dependent on paragraph A74, wherein each of the plurality of rolling elements is formed of at least one of metal, plastic, and ceramic.

A92. The roller assembly of any of paragraphs A74-A91, when dependent on paragraph A74, wherein each of the plurality of rolling elements has a diameter that is at least one of at least 1 millimeter (mm), at least 5 mm, at least 10 mm, at least 15 mm, at least 20 mm, less than 25 mm, less than 17 mm, less than 13 mm, less than 7 mm, and less than 3 mm.

A93. The roller assembly of any of paragraphs A74-A92, when dependent on paragraph A74, wherein the outer race includes an outer race inner surface that defines an outer race channel configured to engage the plurality of rolling elements.

A94. The roller assembly of paragraph A93, wherein the outer race channel has a radius of curvature that is slightly larger than a radius of each of the plurality of rolling elements.

A95. The roller assembly of paragraph A94, wherein the radius of curvature of the outer race channel is at least one of at least 1% greater, at least 5% greater, at least 10% greater, at least 20% greater, at least 30% greater, at most 35% greater, at most 25% greater, at most 15% greater, at most 7% greater, and at most 3% greater than the radius of each of the plurality of rolling elements.

A96. The roller assembly of any of paragraphs A74-A95, when dependent on paragraph A74, wherein the inner race has an inner race outer surface that defines an inner race channel configured to engage the plurality of rolling elements.

A97. The roller assembly of paragraph A96, wherein the inner race has a radius of curvature that is slightly larger than a/the radius of each of the plurality of rolling elements.

A98. The roller assembly of paragraph A97, wherein the radius of curvature of the inner race channel is at least one of at least 1% greater, at least 5% greater, at least 10% greater, at least 20% greater, at least 30% greater, at most 35% greater, at most 25% greater, at most 15% greater, at most 7% greater, and at most 3% greater than the radius of each of the plurality of rolling elements.

A99. The roller assembly of any of paragraphs A96-A98, wherein the radius of curvature of the inner race channel is substantially equal to a/the radius of curvature of the outer race channel.

A100. The roller assembly of any of paragraphs A74-A99, when dependent on paragraph A74, wherein the cage is configured to at least partially enclose each of the plurality of rolling elements.

A101. The roller assembly of any of paragraphs A74-A100, when dependent on paragraphs A74, A93, and A96, wherein the cage is configured to constrain each of the plurality of rolling elements to roll in at least one of the outer race channel and in the inner race channel.

A102. The roller assembly of any of paragraphs A74-A101, when dependent on paragraph A74, wherein the cage is configured to space apart the plurality of rolling elements.

A103. The roller assembly of paragraph A102, wherein the cage is configured to maintain a constant, or at least a substantially constant, arc length between each pair of adjacent rolling elements of the plurality of rolling elements.

A104. The roller assembly of any of paragraphs A74-A103, when dependent on paragraph A74, wherein the cage is configured to maintain each of the plurality of rolling elements in contact with a lubricant.

A105. The roller assembly of any of paragraphs A71-A104, wherein the bracket is operatively connected to the bearing assembly at the inner race.

A106. The roller assembly of paragraph A105, wherein the inner race is rigidly connected to the bracket.

A107. The roller assembly of any of paragraphs A71-A106, wherein the inner race is configured to rotate about the bearing assembly axis.

A108. The roller assembly of any of paragraphs A71-A107, wherein the bracket is operatively connected to the inner race via a hub configured to offset the bearing assembly from the bracket in a direction substantially parallel to the bearing assembly axis.

A109. The roller assembly of paragraph A108, wherein the hub is integrally formed with the bracket.

A110. The roller assembly of paragraph A108, wherein the hub and the bracket are distinct components.

A111. The roller assembly of any of paragraphs A71-A110, wherein the bearing mechanism includes, and optionally is, at least one of a bushing and a sleeve.

A112. The roller assembly of any of paragraphs A1-A111, wherein the trolley assembly further includes a safety stop configured to inhibit removal of the trolley assembly from the elongate rail when the trolley assembly is installed on the elongate rail.

A113. The roller assembly of paragraph A112, wherein the safety stop is positioned generally below the elongate rail when the trolley assembly is installed on the elongate rail.

A114. The roller assembly of any of paragraphs A112-A113, wherein the safety stop is positioned generally between the bearing assembly and the hanging panel when the hanging panel is mounted on the bracket.

A115. The roller assembly of any of paragraphs A112-A114, wherein the safety stop is configured to limit a distance by which the bearing assembly may be lifted above the elongate rail when the trolley assembly is installed on the elongate rail.

A116. The roller assembly of any of paragraphs A112-A115, wherein the safety stop extends from the bracket in the same direction as the bearing assembly extends from the bracket.

A117. The roller assembly of any of paragraphs A112-A116, wherein the safety stop extends from a/the interior bracket face of the bracket.

A118. The roller assembly of any of paragraphs A112-A117, wherein the safety stop extends from the bracket on the same side of the bracket as the hanging panel when the hanging panel is mounted on the bracket.

A119. The roller assembly of any of paragraphs A112-A118, wherein the safety stop is rigidly secured to the bracket.

A120. The roller assembly of paragraph A119, wherein the safety stop is secured to the bracket with a safety stop fastener.

A121. The roller assembly of any of paragraphs A112-A120, wherein the safety stop is generally cylindrical.

A122. The roller assembly of any of paragraphs A112-A121, wherein the safety stop includes a bracket-mounted portion rigidly secured to the bracket and a separable portion configured to be selectively detached from the bracket-mounted portion, wherein the bracket-mounted portion includes a tab receiver, and wherein the separable portion includes an upper face that generally faces the bearing assembly and a resilient tab configured to selectively engage the tab receiver.

A123. The roller assembly of any of paragraphs A112-A122, wherein the safety stop is positioned on the bracket such that a distance between the bottom rail portion and the safety stop is less than a/the outer contact surface depth of a/the outer race outer contact surface when a/the separable portion is engaged with a/the bracket-mounted portion and when the trolley assembly is installed on the elongate rail.

A124. The roller assembly of paragraph A123, wherein the distance between the bottom rail portion and the safety stop is at least one of at least 10% less, at least 20% less, at least 30% less, at least 40% less, at least 50% less, at least 60% less, at least 70% less, at least 80% less, at most 85% less, at most 75% less, at most 65% less, at most 55% less, at most 45% less, at most 35% less, and at most 25% less than the outer contact surface depth of the outer race outer contact surface when the separable portion is engaged with the bracket-mounted portion.

A125. The roller assembly of any of paragraphs A112-A124, wherein the safety stop is configured such that a distance between the bottom rail portion and a/the upper face of a/the bracket-mounted portion is greater than a/the outer contact surface depth of a/the outer race outer contact surface.

A126. The roller assembly of any of paragraphs A112-A125, wherein the safety stop is configured to vary a distance between the bottom rail portion and a proximal portion of the safety stop without removing the safety stop from the bracket, and further wherein the safety stop is configured to vary the distance between the bottom rail portion and the proximal portion of the safety stop by at least one of a cam action, by rotating with respect to at least one of the bracket and the elongate rail, and by sliding with respect to at least one of the bracket and the elongate rail.

A127. The roller assembly of any of paragraphs A112-A126, wherein the safety stop has a cross-sectional shape that is at least one of generally ovoid and generally cam-shaped.

A128. The roller assembly of any of paragraphs A112-A127, wherein the safety stop is formed of at least one of a plastic, a thermoplastic, a rubber, a dense rubber, and a synthetic rubber.

A129. The roller assembly of any of paragraphs A112-A127, when dependent upon paragraph A26, wherein the safety stop is configured to engage the bumper stop when the trolley assembly reaches the trolley assembly stop point.

B1. A method of mounting an elongate rail on a surface, the method comprising:
  providing an elongate rail that includes:
    an integral face plate that at least partially defines a rail cavity, wherein the integral face plate is proximal the surface relative to the rail cavity when the elongate rail is mounted on the surface; and
    an adjustment face with a series of adjustment face ridges defined on a side of the integral face plate that faces the rail cavity;
  providing at least a first adjuster plate and a second adjuster plate, wherein each of the first adjuster plate and the second adjuster plate includes one or more adjuster plate ridges configured to engage the adjustment face ridges of the adjustment face and an adjuster plate mounting hole extending through each of the first adjuster plate and the second adjuster plate;
  providing at least a first rail fastener and a second rail fastener, wherein each of the first rail fastener and the second rail fastener includes a fastener head with a width that is greater than a diameter of the adjuster plate mounting hole and a fastener body with a width that is smaller than the width of the fastener head;
  defining at least a first rail mounting hole and a second rail mounting hole in the integral face plate, wherein each of the first rail mounting hole and the second rail mounting hole has a diameter that is greater than the width of the fastener body;
  inserting the first rail fastener through the adjuster plate mounting hole of the first adjuster plate and through the first rail mounting hole such that the first adjuster plate is between the adjustment face and the fastener head of the first rail fastener;
  inserting the second rail fastener through the adjuster plate mounting hole of the second adjuster plate and through the second rail mounting hole such that the second adjuster plate is between the adjustment face and the fastener head of the second rail fastener;
  loosely securing the first rail fastener and the second rail fastener to the surface such that the elongate rail is generally horizontal;
  at least one of adjusting a position of the first adjuster plate with respect to the adjustment face and adjusting a position of the second adjuster plate with respect to the adjustment face such that the elongate rail is horizontal, or at least substantially horizontal; and
  tightening the first rail fastener to the surface and tightening the second rail fastener to the surface to fix a position of the elongate rail with respect to the surface.

B2. The method of paragraph B1, wherein the method further includes providing at least a third adjuster plate, providing at least a third rail fastener, and defining at least a third rail mounting hole, and still further includes repeating the inserting, the loosely securing, the adjusting, and the tightening with at least the third adjuster plate, the third rail fastener, and the third rail mounting hole.

B3. The method of any of paragraphs B1-B2, wherein the elongate rail is the elongate rail of any of paragraphs A1-A129.

B4. The roller assembly of any of paragraphs B1-B3, wherein at least one of the first adjuster plate and the second adjuster plate is the adjuster plate of any of paragraphs A15-A129.

B5. The roller assembly of any of paragraphs B1-B4, wherein at least one of the first rail fastener and the second rail fastener is the rail fastener of any of paragraphs A15-A129.

B6. The roller assembly of any of paragraphs B1-B5, wherein the defining the at least the first rail mounting hole and the second rail mounting hole includes at least one of drilling, boring, and punching.

B7. The roller assembly of any of paragraphs B1-B6, wherein the surface at least one of covers, includes, and is a plurality of wall studs, and wherein the defining the at least the first rail mounting hole and the second rail mounting hole includes positioning the rail mounting holes such that each rail mounting hole is generally aligned with a wall stud of the plurality of wall studs when the elongate rail is mounted on the surface.

C1. A method of adjusting a vertical position of a panel with respect to a bracket, the method comprising:
  providing a panel that includes a panel mounting hole;
  providing a trolley assembly configured to move along an elongate rail and to support the hanging panel, wherein the trolley assembly includes a bearing assembly configured to translate the trolley assembly along the elongate rail and a bracket operatively coupled to the bearing assembly and operatively coupled to the hanging panel for sliding the hanging panel, wherein the bracket includes:
    an interior bracket face that generally faces the hanging panel;

an exterior bracket face opposite the interior bracket face;

an adjustment channel recessed into the bracket from the interior bracket face and extending in a generally vertical direction;

a dovetail pin positioned in the adjustment channel and extending from the interior bracket face and into the panel mounting hole;

a panel mounting fastener that extends through the panel mounting hole and engages the dovetail pin to bring the dovetail pin into frictional engagement with the adjustment channel and to secure the hanging panel to the bracket; and an adjuster screw extending into the bracket from a bottom end of the bracket, wherein the adjuster screw engages the dovetail pin;

while the panel mounting fastener is at least partially loosened, actuating the adjuster screw to adjust a vertical position of the hanging panel with respect to the bracket; and tightening the panel mounting fastener to fix a location of the hanging panel with respect to the bracket.

C2. The method of paragraph C1, wherein the trolley assembly is the trolley assembly of any of paragraphs A1-A129.

C3. The roller assembly of any of paragraphs C1-C2, wherein the adjustment channel is a lower adjustment channel; wherein the dovetail pin is a lower dovetail pin; wherein the panel mounting fastener is a lower panel mounting fastener; wherein the panel mounting hole is a lower panel mounting hole; wherein the hanging panel further includes an upper panel mounting hole positioned generally vertically above the lower panel mounting hole; wherein the bracket further includes:

an upper adjustment channel positioned generally vertically above the lower adjustment channel;

an upper dovetail pin positioned in the upper adjustment channel;

an upper panel mounting fastener that extends through the upper panel mounting hole and engages the upper dovetail pin to bring the upper dovetail pin into frictional engagement with the upper adjustment channel and to further secure the hanging panel to the bracket; and a mounting plate configured to be positioned on an opposite side of the hanging panel relative to the bracket, wherein the mounting plate includes two mounting plate apertures configured to receive the lower panel mounting fastener and the upper panel mounting fastener, wherein the lower panel mounting fastener and the upper panel mounting fastener are configured to retain the mounting plate against the hanging panel when the hanging panel is installed on the bracket;

and wherein the method further includes actuating the adjuster screw while the upper panel mounting fastener is at least partially loosened, and still further includes tightening the upper panel mounting fastener subsequent to the actuating the adjuster screw.

C4. The roller assembly of paragraph C3, wherein the adjusting includes:

responsive to the actuating the adjuster screw, vertically translating the lower dovetail pin within the lower adjustment channel;

responsive to the vertically translating the lower dovetail pin, vertically translating the lower panel mounting fastener;

responsive to the vertically translating the lower panel mounting fastener, vertically translating the mounting plate;

responsive to the vertically translating the mounting plate, vertically translating the upper panel mounting fastener; and responsive to the vertically translating the upper panel mounting fastener, vertically translating the upper dovetail pin within the upper adjustment channel.

The invention claimed is:

1. A roller assembly for supporting a hanging panel, the roller assembly comprising:

an elongate rail configured to be mounted on a surface, wherein the elongate rail has a top rail portion that is generally horizontal and a bottom rail portion that is at least substantially parallel to the top rail portion; and at least one trolley assembly configured to move along the elongate rail and to support the hanging panel;

wherein the elongate rail includes a rail adjustment system configured to facilitate adjusting at least one of a position of the elongate rail and an orientation of the elongate rail with respect to the surface, wherein the rail adjustment system is concealed in a rail-assembled configuration, and wherein the rail adjustment system includes at least two spaced-apart rail adjustment mechanisms; and wherein the elongate rail further includes a detachable face plate and an integral face plate, wherein the detachable face plate and the integral face plate are coupled together in the rail-assembled configuration, wherein the detachable face plate and the integral face plate define a rail cavity therebetween in the rail-assembled configuration, and wherein the detachable face plate is configured to be separated from a remainder of the elongate rail to expose the rail cavity in a rail-disassembled configuration.

2. The roller assembly of claim 1, wherein the detachable face plate includes a face plate rear that faces generally toward the rail cavity in the rail-assembled configuration, wherein the detachable face plate includes at least one face plate attachment tab positioned on the face plate rear, and wherein the elongate rail includes at least one face plate clip configured to engage the at least one face plate attachment tab to operatively secure the detachable face plate to the integral face plate in the rail-assembled configuration.

3. The roller assembly of claim 1, wherein each rail adjustment mechanism includes:

an adjustment face with a series of adjustment face ridges that are parallel, or at least substantially parallel, to the top rail portion;

an adjuster plate with one or more adjuster plate ridges configured to engage the adjustment face ridges of the adjustment face, an adjuster plate face opposite the adjuster plate ridges, and an adjuster plate mounting hole extending through the adjuster plate; and a rail fastener configured to couple the elongate rail to the surface by extending through the adjuster plate mounting hole and through the adjustment face to operatively engage the adjuster plate ridges with the adjustment face ridges to restrict movement of the adjuster plate relative to the adjustment face;

wherein the adjustment face and the adjuster plate are positioned within the rail cavity.

4. The roller assembly of claim 3, wherein each adjuster plate mounting hole is generally aligned with a corresponding rail mounting hole that extends through the elongate rail when the elongate rail is mounted on the surface; wherein each rail mounting hole has a diameter that is greater than a diameter of the corresponding adjuster plate mounting hole; and wherein the rail fastener passes through the adjuster plate mounting hole and the rail mounting hole to mount the elongate rail to the surface.

5. The roller assembly of claim 4, wherein the rail fastener has a fastener head with a width that is greater than the diameter of the adjuster plate mounting hole and a fastener body with a width that is smaller than the width of the fastener head and that is smaller than the diameter of the rail mounting hole; wherein the fastener body is at least partially threaded; and wherein the fastener head engages the adjuster plate face to retain the adjuster plate against a portion of the adjustment face when the elongate rail is mounted to the surface.

6. The roller assembly of claim 5, wherein the diameter of the rail mounting hole is at least 1.25 times and less than 2.1 times the width of the fastener body.

7. The roller assembly of claim 4, wherein the adjuster plate has an adjuster plate width and an adjuster plate height, and wherein the diameter of the rail mounting hole is smaller than at least one of the adjuster plate width and the adjuster plate height.

8. The roller assembly of claim 3, wherein the adjustment face is integrally formed with the integral face plate, and wherein the adjustment face ridges project from the integral face plate toward the rail cavity.

9. The roller assembly of claim 3, wherein each of the adjustment face ridges has at least one of a triangular profile and a sawtooth profile, and wherein each of the adjuster plate ridges has at least one of a triangular profile and a sawtooth profile.

10. The roller assembly of claim 3, wherein the adjuster plate is generally rectangular.

11. The roller assembly of claim 1, wherein the elongate rail includes a bumper stop positioned on the bottom rail portion configured to limit a range of motion of the trolley assembly, wherein a location of the bumper stop along the bottom rail portion defines a trolley assembly stop point corresponding to a limit of the range of motion, and wherein the location of the bumper stop is continuously adjustable along substantially an entire length of the elongate rail.

12. The roller assembly of claim 1,
wherein the trolley assembly includes a bracket configured to be operatively coupled to the hanging panel for sliding the hanging panel along the elongate rail;
wherein the bracket includes an interior bracket face that generally faces the hanging panel when the hanging panel is installed on the bracket, an exterior bracket face opposite the interior bracket face, and a vertical adjustment mechanism configured to adjust a position of the hanging panel with respect to the bracket in a generally vertical direction, wherein the vertical adjustment mechanism includes:
an adjustment channel recessed into the bracket from the interior bracket face and extending in a generally vertical direction; and
a dovetail pin positioned in the adjustment channel and extending from the interior bracket face;
wherein the adjustment channel includes an angled groove with a tapered cross-sectional profile that tapers toward the interior bracket face; wherein the adjustment channel is configured to retain the dovetail pin at least partially within the bracket; wherein the dovetail pin is configured to slidingly engage with the adjustment channel; and wherein the dovetail pin is configured to be inserted into a corresponding panel mounting hole on the hanging panel.

13. The roller assembly of claim 12,
wherein the adjustment channel is a lower adjustment channel, wherein the dovetail pin is a lower dovetail pin, wherein the panel mounting hole is a lower panel mounting hole, wherein the hanging panel further includes an upper panel mounting hole positioned generally vertically above the lower panel mounting hole, wherein the vertical adjustment mechanism further includes an upper adjustment channel positioned generally vertically above the lower adjustment channel and an upper dovetail pin positioned in the upper adjustment channel and extending from the interior bracket face, and wherein the upper dovetail pin is configured to be inserted into the upper panel mounting hole;
wherein the vertical adjustment mechanism further includes an adjuster screw extending into the bracket from a bottom end of the bracket, wherein the adjuster screw engages the lower dovetail pin, and wherein the adjuster screw is configured to adjust a vertical position of the lower dovetail pin along the lower adjustment channel.

14. The roller assembly of claim 1,
wherein the trolley assembly includes a bearing assembly configured to translate the trolley assembly along the top rail portion and a bracket operatively coupled to the bearing assembly and configured to be operatively coupled to the hanging panel for sliding the hanging panel along the elongate rail;
wherein the bearing assembly includes an outer race with an outer race outer contact surface configured to contact the top rail portion, an inner race concentric with the outer race, and a bearing mechanism located generally between the outer race and the inner race; wherein the outer race is configured to rotate about a bearing assembly axis; wherein the bearing mechanism is configured to contact the outer race and the inner race to reduce a rolling resistance therebetween,
wherein the outer race outer contact surface is concave, and wherein the outer race outer contact surface has an outer contact surface radius of curvature and an outer contact surface depth as measured from a portion of the outer race outer contact surface that is proximal the bearing assembly axis to a portion of the outer race outer contact surface that is distal the bearing assembly axis; and
wherein the outer race outer contact surface has a cross-sectional profile that generally corresponds to a cross-sectional shape of the top rail portion.

15. The roller assembly of claim 14,
wherein the trolley assembly further includes a safety stop configured to inhibit removal of the trolley assembly from the elongate rail when the trolley assembly is installed on the elongate rail;
wherein the safety stop includes a bracket-mounted portion rigidly secured to the bracket and a separable portion configured to be selectively detached from the bracket-mounted portion;
wherein the safety stop is positioned on the bracket such that a distance between the bottom rail portion and the safety stop is less than the outer contact surface depth of the outer race when the separable portion is engaged with the bracket-mounted portion and when the trolley assembly is installed on the elongate rail; and wherein the safety stop is configured such that a distance between the bottom rail portion and an upper face of the bracket-mounted portion is greater than the outer contact surface depth of the outer race.

16. A method, comprising:
providing the roller assembly of claim 1, wherein the integral face plate includes an adjustment face with a series of adjustment face ridges defined on a side of the integral face plate that faces the rail cavity, and wherein the at least two spaced-apart rail adjustment mechanisms include:
    a first rail adjustment mechanism that includes:
        a first adjuster plate with one or more first adjuster plate ridges configured to engage the adjustment face ridges of the adjustment face, a first adjuster plate face opposite the first adjuster plate ridges, and a first adjuster plate mounting hole extending through the first adjuster plate; and
        a first rail fastener, wherein the first rail fastener includes a first fastener head with a width that is greater than a diameter of the first adjuster plate mounting hole and a first fastener body with a width that is smaller than the width of the first fastener head; and
    a second rail adjustment mechanism that includes:
        a second adjuster plate with one or more second adjuster plate ridges configured to engage the adjustment face ridges of the adjustment face, a second adjuster plate face opposite the second adjuster plate ridges, and a second adjuster plate mounting hole extending through the second adjuster plate; and
        a second rail fastener, wherein the second rail fastener includes a second fastener head with a width that is greater than a diameter of the second adjuster plate mounting hole and a second fastener body with a width that is smaller than the width of the second fastener head;
defining at least a first rail mounting hole and a second rail mounting hole in the integral face plate, wherein the first rail mounting hole has a diameter that is greater than the width of the first fastener body, and wherein the second rail mounting hole has a diameter that is greater than the width of the second fastener body;
inserting the first rail fastener through the first adjuster plate mounting hole and through the first rail mounting hole such that the first adjuster plate is between the adjustment face and the first fastener head;
inserting the second rail fastener through the second adjuster plate mounting hole and through the second rail mounting hole such that the second adjuster plate is between the adjustment face and the second fastener head;
loosely securing the first rail fastener and the second rail fastener to the surface such that the elongate rail is generally horizontal;
at least one of adjusting a position of the first adjuster plate with respect to the adjustment face and adjusting a position of the second adjuster plate with respect to the adjustment face such that the elongate rail is substantially horizontal;
tightening the first rail fastener to the surface and tightening the second rail fastener to the surface to fix a position of the elongate rail with respect to the surface; and coupling the detachable face plate to the integral face plate to conceal the spaced-apart rail adjustment mechanisms in the rail cavity.

17. A roller assembly for supporting a hanging panel, the roller assembly comprising:
an elongate rail configured to be mounted on a surface, wherein the elongate rail has a top rail portion that is generally horizontal and a bottom rail portion that is at least substantially parallel to the top rail portion; and
at least one trolley assembly configured to move along the elongate rail and to support the hanging panel, wherein the trolley assembly includes a bearing assembly configured to translate the trolley assembly along the top rail portion and a bracket operatively coupled to the bearing assembly and configured to be operatively coupled to the hanging panel for sliding the hanging panel along the elongate rail;
wherein the elongate rail includes a rail adjustment system configured to facilitate adjusting at least one of a position and an orientation of the elongate rail with respect to the surface, wherein the rail adjustment system is concealed in a rail-assembled configuration, and wherein the rail adjustment system includes at least two spaced-apart rail adjustment mechanisms;
wherein the elongate rail includes a bumper stop positioned on the bottom rail portion configured to limit a range of motion of at least one of the trolley assembly and the hanging panel, wherein a location of the bumper stop along the bottom rail portion defines a trolley assembly stop point corresponding to a limit of the range of motion, and wherein the location of the bumper stop is continuously adjustable along substantially an entire length of the elongate rail;
wherein the bracket includes an interior bracket face that generally faces the hanging panel when the hanging panel is installed on the bracket, an exterior bracket face opposite the interior bracket face, and a vertical adjustment mechanism configured to adjust a position of the hanging panel with respect to the bracket in a generally vertical direction, wherein the vertical adjustment mechanism includes:
    an adjustment channel recessed into the bracket from the interior bracket face and extending in a generally vertical direction;
    a dovetail pin positioned in the adjustment channel and extending from the interior bracket face; and
    an adjuster screw extending into the bracket from a bottom end of the bracket, wherein the adjuster screw engages the dovetail pin, and wherein the adjuster screw is configured to adjust a vertical position of the dovetail pin along the adjustment channel;
wherein the adjustment channel includes an angled groove with a tapered cross-sectional profile that tapers toward the interior bracket face; wherein the adjustment channel is configured to retain the dovetail pin at least partially within the bracket; wherein the dovetail pin is configured to slidingly engage with the adjustment channel; and wherein the dovetail pin is configured to be inserted into a corresponding panel mounting hole on the hanging panel;
wherein the bearing assembly includes an outer race with an outer race outer contact surface configured to contact the top rail portion, an inner race concentric with the outer race, and a bearing mechanism generally between the outer race and the inner race; wherein the outer race is configured to rotate about a bearing assembly axis; wherein the bearing mechanism is configured to contact the outer race and the inner race to reduce a rolling resistance therebetween; wherein the outer race outer contact surface is concave; wherein the outer race outer contact surface has an outer contact surface radius of curvature and an outer contact surface depth as measured from a portion of the outer race outer contact surface that is proximal the bearing assembly axis to a portion of the outer race outer contact surface that is distal the bearing assembly axis; wherein the outer race outer contact surface has a cross-sectional profile that generally corresponds to a cross-sectional shape of the top rail portion; and wherein the trolley assembly further includes a safety stop configured to inhibit removal of the trolley assembly from the elongate rail when the trolley assembly is installed on the elongate rail.

18. The roller assembly of claim 17,
wherein the safety stop includes a bracket-mounted portion rigidly secured to the bracket and a separable portion configured to be selectively detached from the bracket-mounted portion;
wherein the safety stop is positioned on the bracket such that a distance between the bottom rail portion and the safety stop is less than the outer contact surface depth of the outer race when the separable portion is engaged with the bracket-mounted portion and when the trolley assembly is installed on the elongate rail; and
wherein the safety stop is configured such that a distance between the bottom rail portion and an upper face of the bracket-mounted portion is greater than the outer contact surface depth of the outer race.

19. A roller assembly for supporting a hanging panel, the roller assembly comprising:
an elongate rail configured to be mounted on a surface, wherein the elongate rail has a top rail portion that is generally horizontal and a bottom rail portion that is parallel, or at least substantially parallel, to the top rail portion; and
at least one trolley assembly configured to move along the elongate rail and to support the hanging panel;
wherein the elongate rail includes means for adjusting at least one of a position and an orientation of the elongate rail with respect to the surface, wherein the means for adjusting is concealed in a rail-assembled configuration.

20. A roller assembly for supporting a hanging panel, the roller assembly comprising:
an elongate rail configured to be mounted on a surface, wherein the elongate rail has a top rail portion that is generally horizontal and a bottom rail portion that is at least substantially parallel to the top rail portion; and
at least one trolley assembly configured to move along the elongate rail and to support the hanging panel;
wherein the elongate rail includes a rail adjustment system configured to facilitate adjusting at least one of a position of the elongate rail and an orientation of the elongate rail with respect to the surface, and wherein the rail adjustment system includes at least two spaced-apart rail adjustment mechanisms; and
wherein the elongate rail includes a bumper stop coupled to the elongate rail and configured to limit a range of motion of the trolley assembly, wherein a location of the bumper stop along the bottom rail portion defines a trolley assembly stop point corresponding to a limit of the range of motion, and wherein the location of the bumper stop is continuously adjustable along substantially an entire length of the elongate rail.

21. The roller assembly of claim 20, wherein the location of the bumper stop is configured to be continuously adjustable without obstruction by and without interference with the rail adjustment mechanism.

22. The roller assembly of claim 20, wherein the location of the bumper stop is configured to be continuously adjustable without obstruction by and without interference with mounting hardware for mounting the elongate rail on the surface.

23. The roller assembly of claim 20, wherein the elongate rail includes a bumper slot extending longitudinally along the elongate rail.

24. The roller assembly of claim 23, wherein the bumper slot extends along substantially the entire length of the elongate rail.

25. A roller assembly for supporting a hanging panel, the roller assembly comprising:
an elongate rail configured to be mounted on a surface, wherein the elongate rail has a top rail portion that is generally horizontal and a bottom rail portion that is at least substantially parallel to the top rail portion; and
at least one trolley assembly configured to move along the elongate rail and to support the hanging panel, wherein the trolley assembly includes a bracket configured to be operatively coupled to the hanging panel for sliding the hanging panel along the elongate rail;
wherein the elongate rail includes a rail adjustment system configured to facilitate adjusting at least one of a position of the elongate rail and an orientation of the elongate rail with respect to the surface, and wherein the rail adjustment system includes at least two spaced-apart rail adjustment mechanisms; and
wherein the bracket includes an interior bracket face that generally faces the hanging panel when the hanging panel is installed on the bracket, an exterior bracket face opposite the interior bracket face, and a vertical adjustment mechanism configured to adjust a position of the hanging panel with respect to the bracket in a generally vertical direction, wherein the vertical adjustment mechanism includes:
an adjustment channel recessed into the bracket from the interior bracket face and extending in a generally vertical direction; and
a dovetail pin positioned in the adjustment channel and extending from the interior bracket face;
wherein the adjustment channel includes an angled groove with a tapered cross-sectional profile that tapers toward the interior bracket face; wherein the adjustment channel is configured to retain the dovetail pin at least partially within the bracket; wherein the dovetail pin is configured to slidingly engage with the adjustment channel; and wherein the dovetail pin is configured to be inserted into a corresponding panel mounting hole on the hanging panel.

26. The roller assembly of claim 25,
wherein the adjustment channel is a lower adjustment channel, wherein the dovetail pin is a lower dovetail pin, wherein the panel mounting hole is a lower panel mounting hole, wherein the hanging panel further includes an upper panel mounting hole positioned generally vertically above the lower panel mounting hole, wherein the vertical adjustment mechanism further includes an upper adjustment channel positioned generally vertically above the lower adjustment channel and an upper dovetail pin positioned in the upper adjustment channel and extending from the interior bracket face, and wherein the upper dovetail pin is configured to be inserted into the upper panel mounting hole;

wherein the vertical adjustment mechanism further includes an adjuster screw extending into the bracket from a bottom end of the bracket, wherein the adjuster screw engages the lower dovetail pin, and wherein the adjuster screw is configured to adjust a vertical position of the lower dovetail pin along the lower adjustment channel.

27. The roller assembly of claim 26, wherein the upper dovetail pin and the lower dovetail pin each include a generally frusto-conical portion and a generally cylindrical portion, wherein the generally frusto-conical portion and the generally cylindrical portion are axially aligned such that a circular end of the generally cylindrical portion abuts a narrower circular end of the generally frusto-conical portion; and wherein the upper adjustment channel and the lower adjustment channel each include the angled groove, and wherein the angled groove is configured to slidingly engage the generally frusto-conical portion of the corresponding upper dovetail pin and lower dovetail pin.

28. The roller assembly of claim 26, wherein the vertical adjustment mechanism further includes an upper pin sleeve coupled to the upper dovetail pin and a lower pin sleeve coupled to the lower dovetail pin, wherein the upper pin sleeve and the lower pin sleeve are configured to provide a physical barrier between the upper dovetail pin and the hanging panel and between the lower dovetail pin and the hanging panel when the upper dovetail pin is inserted into the upper panel mounting hole and the lower dovetail pin is inserted into the lower panel mounting hole.

29. The roller assembly of claim 26, wherein the vertical adjustment mechanism further includes a cover plate positioned at least partially over the upper adjustment channel and the lower adjustment channel to inhibit the upper dovetail pin from being removed from the upper adjustment channel and inhibit the lower dovetail pin from being removed from the lower adjustment channel.

30. A roller assembly for supporting a hanging panel, the roller assembly comprising:

an elongate rail configured to be mounted on a surface, wherein the elongate rail has a top rail portion that is generally horizontal and a bottom rail portion that is at least substantially parallel to the top rail portion; and at least one trolley assembly configured to move along the elongate rail and to support the hanging panel, wherein the trolley assembly includes a bearing assembly configured to translate the trolley assembly along the top rail portion and a bracket operatively coupled to the bearing assembly and configured to be operatively coupled to the hanging panel for sliding the hanging panel along the elongate rail;

wherein the elongate rail includes a rail adjustment system configured to facilitate adjusting at least one of a position of the elongate rail and an orientation of the elongate rail with respect to the surface, and wherein the rail adjustment system includes at least two spaced-apart rail adjustment mechanisms; and wherein the bearing assembly includes an outer race with an outer race outer contact surface configured to contact the top rail portion, an inner race concentric with the outer race, and a bearing mechanism located generally between the outer race and the inner race; wherein the outer race is configured to rotate about a bearing assembly axis; wherein the bearing mechanism is configured to contact the outer race and the inner race to reduce a rolling resistance therebetween, wherein the outer race outer contact surface is concave, and wherein the outer race outer contact surface has an outer contact surface radius of curvature and an outer contact surface depth as measured from a portion of the outer race outer contact surface that is proximal the bearing assembly axis to a portion of the outer race outer contact surface that is distal the bearing assembly axis;

wherein the outer race outer contact surface has a cross-sectional profile that generally corresponds to a cross-sectional shape of the top rail portion;

wherein the trolley assembly further includes a safety stop configured to inhibit removal of the trolley assembly from the elongate rail when the trolley assembly is installed on the elongate rail;

wherein the safety stop includes a bracket-mounted portion rigidly secured to the bracket and a separable portion configured to be selectively detached from the bracket-mounted portion;

wherein the safety stop is positioned on the bracket such that a distance between the bottom rail portion and the safety stop is less than the outer contact surface depth of the outer race when the separable portion is engaged with the bracket-mounted portion and when the trolley assembly is installed on the elongate rail; and wherein the safety stop is configured such that a distance between the bottom rail portion and an upper face of the bracket-mounted portion is greater than the outer contact surface depth of the outer race.

* * * * *